US012749292B2

(12) United States Patent
Wu et al.

(10) Patent No.: US 12,749,292 B2
(45) Date of Patent: Sep. 29, 2026

(54) FEATURE TRACKING

(71) Applicant: NVIDIA Corporation, Santa Clara, CA (US)

(72) Inventors: Yue Wu, Mountain View, CA (US); Cheng-Chieh Yang, Sunnyvale, CA (US); Xin Tong, Santa Clara, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 431 days.

(21) Appl. No.: 18/184,071

(22) Filed: Mar. 15, 2023

(65) Prior Publication Data

US 2024/0312187 A1 Sep. 19, 2024

(51) Int. Cl.
*G06V 10/771* (2022.01)
*G06V 10/77* (2022.01)

(52) U.S. Cl.
CPC ........ *G06V 10/771* (2022.01); *G06V 10/7715* (2022.01)

(58) Field of Classification Search
None
See application file for complete search history.

(56) References Cited

U.S. PATENT DOCUMENTS

| | | | | |
|---|---|---|---|---|
| 10,309,777 | B2 * | 6/2019 | Zhang | G06T 7/246 |
| 11,004,093 | B1 * | 5/2021 | Moon | G06V 20/53 |
| 11,210,537 | B2 * | 12/2021 | Koivisto | G01S 7/417 |
| 11,670,001 | B2 * | 6/2023 | Mousavian | G06N 3/045 701/27 |
| 11,775,607 | B2 * | 10/2023 | Denninghoff | G06Q 30/0201 707/722 |
| 11,775,615 | B2 * | 10/2023 | Chiu | G06N 3/08 |
| 11,816,975 | B2 * | 11/2023 | Ton-That | G08B 17/005 |
| 12,327,413 | B2 * | 6/2025 | Ren | G06V 20/56 |
| 2007/0121596 | A1 * | 5/2007 | Kurapati | H04L 63/1458 370/356 |
| 2022/0180117 | A1 * | 6/2022 | Chiu | G06F 18/22 |
| 2022/0215744 | A1 * | 7/2022 | Ton-That | G06F 16/587 |
| 2022/0284071 | A1 * | 9/2022 | Denninghoff | G06F 16/9577 |
| 2022/0297706 | A1 * | 9/2022 | Nilsson | G06V 10/80 |
| 2023/0016568 | A1 * | 1/2023 | Sriram | G06V 10/7625 |
| 2023/0286530 | A1 * | 9/2023 | Angerer | G01C 21/3807 |
| 2023/0401274 | A1 * | 12/2023 | Denninghoff | G06Q 30/0251 |
| 2024/0312187 | A1 * | 9/2024 | Wu | G06V 10/771 |

* cited by examiner

*Primary Examiner* — Matthew C Bella
(74) *Attorney, Agent, or Firm* — IRON SUMMIT IP LLP

(57) ABSTRACT

In various examples, feature tracking for autonomous or semi-autonomous systems and applications is described herein. Systems and methods are disclosed that merge, using one or more processes, features detected using a feature tracker(s) and features detected using a feature detector(s) in order to track features between images. In some examples, the number of merged features and/or the locations of the merged features within the images are limited. This way, the systems and methods are able to identify merged features that are of greater importance for tracking while refraining from tracking merged features that are of less importance. For example, if the systems and methods are being used to identify features for autonomous driving, a greater number of merged features that are associated with objects located proximate to the driving surface may be tracked as compared to merged features that are associated with the sky.

20 Claims, 19 Drawing Sheets

FEATURE TRACKING

BACKGROUND

Tracking features—and thus an object or actor corresponding thereto, in some circumstances—through a sequence of images or other sensor modality representations is common in various applications, such as for autonomous or semi-autonomous machine applications. Existing systems typically rely on software to track features through a sequence of images, such as software executed using a central processing unit (CPU) and/or a graphics processing unit (GPU). However, in applications that require fast tracking of many features, the linear dependence of run time on the number of features may be prohibitive and may require excess or unavailable resources to implement in real-time or near real-time. As such, existing systems that use software to track features may be inadequate for some applications, such as automotive applications for which hundreds or thousands of features are detected and attempted to be tracked.

As such, some existing systems may use hardware-accelerated processors to perform optical flow estimation over a sequence of images. For instance, a hardware-accelerated processor may estimate two-dimensional (2D) displacements of pixels between two images of a sequence of images. The hardware-accelerated processor may then use the 2D displacements of pixels to calculate the motion between the two images at discrete pixel locations (e.g., every pixel location). However, these processors may not be directly applicable to feature tracking applications due to, as an example, the constraints on spatial locations of features. For instance, hardware-accelerated processors may not be able to track features at subpixel locations within images, thus reducing the accuracy or precision of feature tracking.

SUMMARY

Embodiments of the present disclosure relate to feature tracking for autonomous or semi-autonomous systems and applications. Systems and methods are disclosed that merge, using one or more processes, features (referred to, in some examples, as "tracked features") detected using a feature tracker(s) and features (referred to, in some examples, as "detected features") detected using a feature detector(s) in order to identify features (e.g., referred to, in some examples, as "merged features") for tracking between images. In some examples, the number of merged features and/or the locations of the merged features within the images (or other sensor modality representations, such as point clouds, projection images, range images, etc.) are limited. This way, the systems and methods are able to identify merged features that are of greater importance for tracking while refraining from tracking merged features that are of less importance. For example, if the systems and methods are being used to identify features for autonomous driving, a greater number of merged features that are associated with objects located proximate to the road may be tracked as compared to merged features that are associated with the sky.

In contrast to conventional systems, such as the conventional systems described above that implement feature tracking using software, the current systems, in some embodiments, are able to merge tracked features from the feature tracker(s) with detected features from the feature detector(s) in order to better identify features that are of greater importance for tracking while refraining from tracking features that are of lesser importance for tracking. As such, and as described herein, the current systems are able to track features in real-time and/or near real-time without requiring excess and/or unavailable resources to implement. Additionally, in contrast to conventional systems, such as the conventional systems described above that implement feature tracking using hardware, the current systems, in some embodiments, may not be constrained on the spatial locations of the features. For example, the current systems may be able to track features at subpixel locations within images, which may increase the accuracy and precision of the current systems as compared to these conventional systems.

BRIEF DESCRIPTION OF THE DRAWINGS

The present systems and methods for feature tracking for autonomous or semi-autonomous machines and applications are described in detail below with reference to the attached drawing figures, wherein.

DETAILED DESCRIPTION

Figure 1:
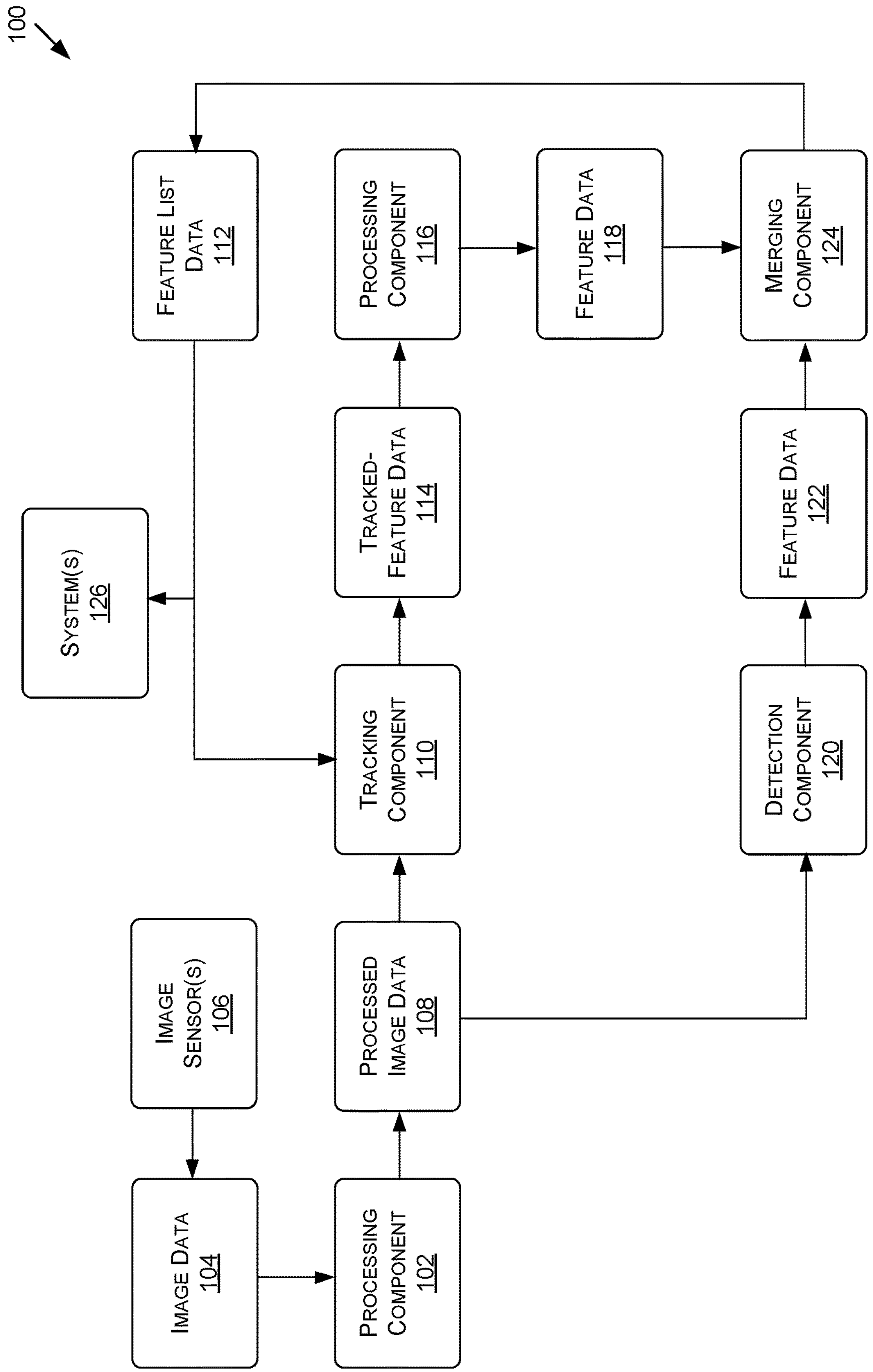
FIG. 1 illustrates an example data flow diagram for a process of tracking features, in accordance with some embodiments of the present disclosure.

Systems and methods are disclosed related to feature tracking for autonomous or semi-autonomous systems and applications. Although the present disclosure may be described with respect to an example autonomous or semi-autonomous vehicle or machine 1300 (alternatively referred to herein as "vehicle 1300" or "ego-machine 1300," an example of which is described with respect to FIGS. 13A-13D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to feature tracking in autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where feature tracking may be used.

For instance, a system(s) may receive image data (or more generally referred to as "sensor data") generated using one or more sensors, such as image data generated using one or more cameras and/or one or more image sensors of a vehicle or other machine. In some examples, the system(s) may then process the image data in order to generate additional image data representing an additional image(s). For example, and for image data representing an image, the system(s) may process the image data using a filter, such as 3×3 prefilter (and/or any other type of filter in other examples), in order to generate second image data representing a second image. The second image may then be written to a first level (e.g., Level 0) of a pyramid (e.g., a Gaussian pyramid). If the pyramid includes more levels, the system(s) may then process the second image data using a filter, such as a 5×5 filter (and/or any other type of filter in other examples), in order to generate third image data representing a third image. The third image may then be written to a second level (e.g., Level 1) of the pyramid. The system(s) may then continue to perform these processes to generate one or more additional images for one or more additional levels of the pyramid.

The system(s) may then process the image data (e.g., the image data associated with the pyramid) using a feature tracker(s) in order to track features (e.g., tracked features) between the image represented by the image data and a previous image represented by previously generated image data (which may also be associated with a pyramid). The feature tracker(s) may use one or more software feature tracking techniques and/or one or more hardware feature tracking techniques. For instance, the technique(s) may include, but is not limited to, Kanade-Lucas-Tomasi (KLT), inverse compositional KLT, Speeded Up Robust Features (SURF), Scale Invariant Feature Transformer (SIFT), optical flow estimation, and/or any other type of feature tracking technique. In some examples, such as when the feature tracker(s) processes the image data representing the pyramids, the feature tracker(s) may perform feature tracking using translation on one or more specific levels of the pyramids (e.g., Level 1 and greater) while performing feature tracking using both scaling and translation on one or more other levels of the pyramids (e.g., Level 0). An output from the feature tracker(s) may include a list of tracked features, confidence scores associated with the tracked features, timestamps associated with the tracked features, and/or any other information associated with the tracked features.

In some examples, the system(s) may perform processing on the output using one or more techniques in order to filter the tracked features. For a first example, the system(s) may process the output in order to remove one or more tracked features that are within a threshold distance to one or more other tracked features. For a second example, the system(s) may process the output in order to remove one or more tracked features that are associated with one or more confidence scores that are less than a threshold confidence score. While these are just a couple example techniques of how the system(s) may process the output, in other examples, the system(s) may process the output using additional and/or alternative techniques. In some examples, the output from the processing includes a first feature score map that indicates at least the tracked features (e.g., after filtering) and the confidence scores for the tracked features.

The system(s) may also process the image data (e.g., the image data associated with the pyramid) using a feature detector(s) in order to identify features (e.g., detected features) associated with the image. The feature detector(s) may use one or more techniques for performing the feature detection such as, but not limited to, Harris Corner, SIFT, SURF, Features from Accelerated Segment Test (FAST), Oriented FAST and Rotated BRIEF (ORB), and/or any other feature detection technique. In some examples, the feature detector(s) may use the images associated with the pyramid in order to identify the detected features within the image (e.g., the original image that is associated with the pyramid). The output from the feature detector(s) may then include a list of detected features, confidence scores associated with the detected features, timestamps associated with the detected features, and/or any other information associated with the detected features. For instance, the output from the feature detector(s) may include a second feature score map that indicates at least the detected features and the confidence scores for the detected features.

The system(s) may then process the output from the feature tracker(s) and the output from the feature detector(s) in order to generate an output that merges features (e.g., merged features). For example, the system(s) may initially combine (e.g., merge) the first feature score map generated using the feature tracker(s) with the second feature score map generated using the feature detector(s). In some examples, the system(s) may perform various processes when combining the feature score maps. For a first example, if a tracked feature from the first feature score map is associated with a detected feature from the second feature score map, then one of the tracked feature or the detected feature (e.g., the tracked feature) may be selected for inclusion in the merged features. For a second example, if two features (e.g., two tracked features, two detected features, etc.) are associated with one another, then the feature associated with the highest confidence score may be selected for inclusion in the merged features. In either example, a feature may be associated with another feature based on the feature being within a threshold distance to the other feature, which is described in more detail herein.

In some examples, the system(s) may limit the number of features that are located within portions (e.g., cells) of the image. For example, the system(s) may initially partition the image into a number of portions such as, but not limited to, one portion, five portions, ten portions, fifty portions, one hundred portions, and/or any other number of portions. In some examples, the portions may include one or more shapes such as, but not limited to, rectangles, squares, circles, triangles, and/or any other shape. The system(s) may then determine a respective threshold (e.g., maximum) number of features that are allowed for one or more (e.g., each) of the portions of the image. A threshold number of features may include, but is not limited to, one feature, five features, ten features, fifty features, one hundred features, one thousand features, and/or any other number of features.

Next, and for a portion, the system(s) may determine the number of features within the portion. If the number of features is greater than the threshold number of features associated with the portion, the system(s) may select a portion of the features (e.g., a portion that is equal to the threshold number of features) for inclusion in the merged features, such as the portion of the features that are associated with the highest confidence scores. Additionally, if the number of features is equal to the threshold number of features, then the system(s) may select the features (e.g., all of the features) for inclusion in the merged features. Furthermore, if the number of features is less than the threshold number of features, then the system(s) may again select the features (e.g., all of the features) for inclusion in the merged features. Additionally, in some examples, the system(s) may determine a difference between the number of features and the threshold number of features and then allocate that difference to one or more other portions of the image.

The output from the processing may include at least a list of the merged features. In some examples, the system(s) may send the output to one or more other systems for further processing, such as a system(s) that performs object detection, object tracking, route planning, and/or the like. Additionally, in some examples, the system(s) may use the output to again perform the processes described herein in order to continue tracking features. For instance, and as described herein, the feature tracker(s) may use the image data representing the image (e.g., the image data associated with the pyramid) to track features between the image and a previous image represented by previously generated image data (which may also be associated with a pyramid). As such, the system(s) may use the output as the previous image and/or use the output to generate a pyramid associated with the previous image. This way, the system(s) may continue to track features as the sensor(s) continue to generate the image or sensor data.

The systems and methods described herein may be used by, without limitation, non-autonomous vehicles, semi-autonomous vehicles (e.g., in one or more adaptive driver assistance systems (ADAS)), autonomous vehicles, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example data flow diagram for a process 100 of tracking features, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle 1300 of FIGS. 13A-13D, example computing device 1400 of FIG. 14, and/or example data center 1500 of FIG. 15.

The process 100 may include a processing component 102 receiving image data 104 generated using an image sensor(s) 106. As described herein, the image sensor(s) 106 may be associated with one or more cameras, such as one or more red-green-blue (RGB) cameras, one or more infrared (IR) cameras, and/or any other type of camera. In the example of FIG. 1, the image data 104 may represent a sequence of images, such as a first image generated at a first time, a second image generated at a second time, a third image generated at a third time, a fourth image generated at a fourth time, and/or so forth. In some examples, the image data is associated with a frame rate such as, but not limited to, fifteen frames-per-second (FPS), thirty FPS, sixty FPS, and/or any other frame rate. Although described herein primarily with respect to image data, this is not intended to be limiting, and the sensor data used herein may include sensor data generated using any sensor modality (e.g., image sensors, LiDAR, RADAR, ultrasonic, etc.) and corresponding to any sensor data representation (e.g., image, point cloud, range image, bird's eye view (BEV) representation, etc.) in any suitable format.

The process 100 may include the processing component 102 processing the image data 104 in order to generate processed image data 108. In some examples, the processing component 102 may process the image data 104 using one or more filters that scale down the image into smaller images. For example, the processing component 102 may process the image data 104 in order to generate a Gaussian pyramid associated with the image. In such an example, the processing component 102 may process the original image using a first filter, such as a 3×3 prefilter (and/or any other type of filter in other examples), in order to generate a first image that is written to a first level (e.g., Level 0) of the pyramid. The processing component 102 may then process the first image using a second filter, such as a 5×5 filter (and/or any other type of filter in other examples), in order to generate a second image that is written to a second level (e.g., Level 1) of the pyramid. Additionally, the processing component 102 may continue to perform these processes in order to generate additional levels of the pyramid. In some examples, the pyramid may include any number of levels such as, but not limited to, one level, two levels, five levels, ten levels, and/or so forth.

Figure 2:
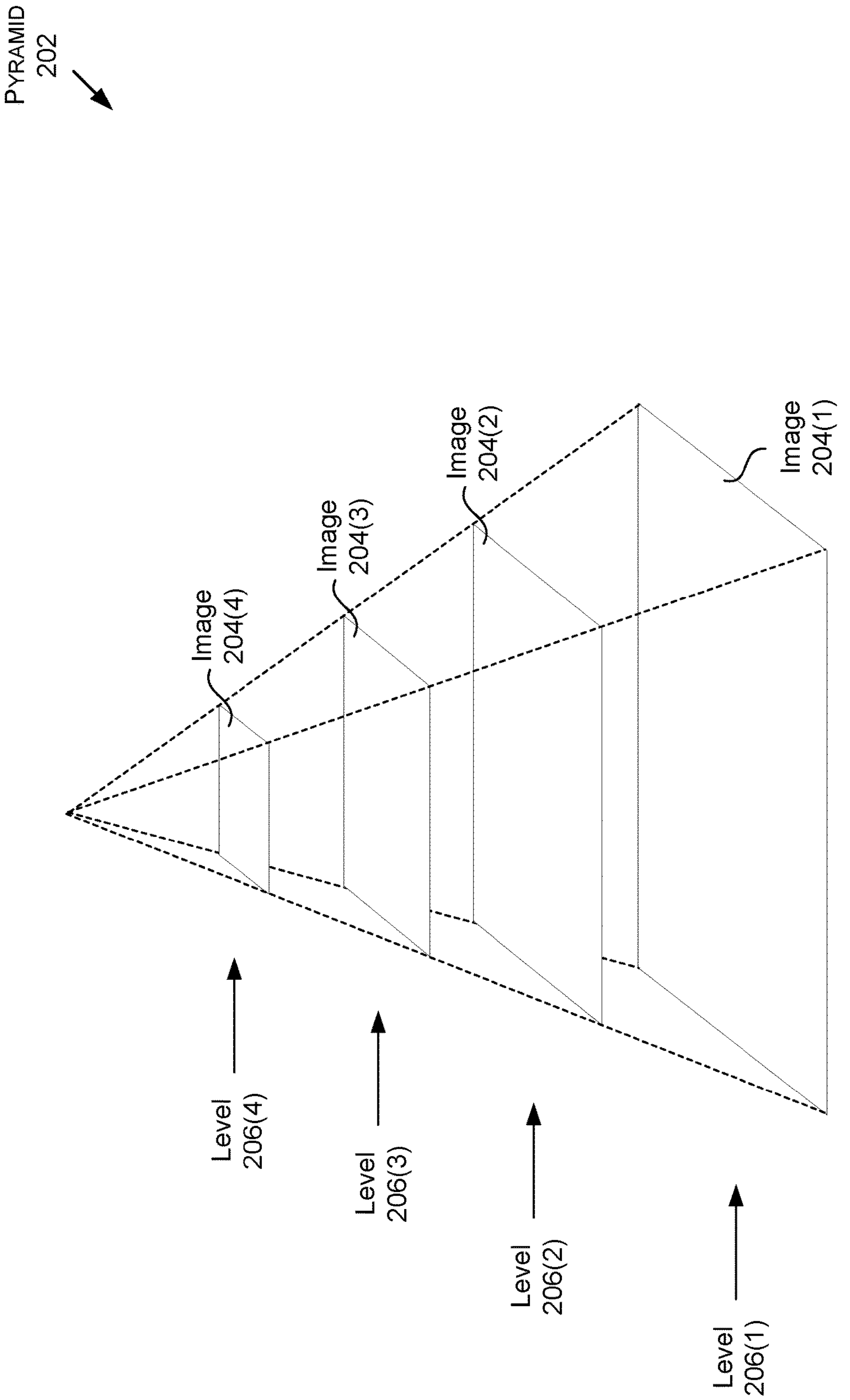
FIG. 2 illustrates an example of processing an image in order to generate a pyramid of images, in accordance with some embodiments of the present disclosure.

For instance, FIG. 2 is an example of processing an image in order to generate a pyramid 202, in accordance with some embodiments of the present disclosure. In the example of FIG. 2, the processing component 102 may process image data (e.g., the image data 104) representing an image using a first filter (e.g., a plain 3×3 prefilter, etc.) in order to generate a first image 204(1) that is written to a first level 206(1) (e.g., Level 0) of the pyramid 202. The processing component 102 may then process the first image 204(1) using a second filter (e.g., the first filter, a 5×5 filter, etc.) in order to generate a second image 204(2) that is written to a second level 206(2) (e.g., Level 1) of the pyramid 202. Additionally, the processing component 102 may then process the second image 204(2) using a third filter (e.g., the first filter, the second filter, another 5×5 filter, etc.) in order to generate a third image 204(3) that is written to a third level 206(3) (e.g., Level 2) of the pyramid 202. Furthermore, the processing component 102 may then process the third image 204(3) using a fourth filter (e.g., the first filter, the second filter, the third filter, another 5×5 filter, etc.) in order to generate a fourth image 204(4) that is written to a fourth level 206(4) (e.g., Level 3) of the pyramid 202. In some examples, the processing component 102 may continue to perform these processes in order to generate one or more additional images to write to one or more additional levels of the pyramid 202.

As shown by the example of FIG. 2, the second image 204(2) may include a scaled down version of the first image 204(1), the third image 204(3) may include a scaled down version of the second image 204(2), and the fourth image 204(4) may include a scaled down version of the third image 204(3). In some examples, each image 204(2)-(4) is scaled down by a factor of two along each coordinate direction as compared to the previous image 204(1)-(3). However, in other examples, each image 204(2)-(4) may be scaled down by another factor in one or more of the coordinate directions as compared to the previous image 204(1)-(3). Additionally, by performing such processes, the first image 204(1) may include a higher resolution than the second image 204(2), the second image 204(2) may include a higher resolution than the third image 204(3), and the third image 204(3) may include a higher resolution than the fourth image 204(4).

Referring back to the example of FIG. 1, the process 100 may include a tracking component 110 that processes the processed image data 108 along with feature list data 112 (which is described in more detail herein) in order to generate tracked-feature data 114. As described herein, the tracking component 110 may use one or more techniques to perform feature tracking. The technique(s) may include, but is not limited to, KLT, inverse compositional KLT, SURF, SIFT, optical flow estimation, and/or any other type of feature tracking technique. Additionally, in some examples, such as when the processed image data 108 represents a pyramid of images, the tracking component 110 may use one or more techniques based on the level of the pyramid that is being processed.

For example, the tracking component 110 may only use translation to track features between two images when the two images are associated with one or more levels of the pyramid (e.g., all levels except for the first level, Level 0). To use translation to track a feature, the tracking component 110 may determine, based on one or more previous detections of a feature, a predicted location and/or orientation of the feature within the current image. As described herein, the location may include a two-dimensional (2D) location of the feature, such as a x-coordinate and a y-coordinate within an image, or a three-dimensional (3D) location of the feature, such as a x-coordinate, a y-coordinate, and a z-coordinate within a real-world environment. Additionally, the orientation may include a roll, pitch, and/or yaw associated with the feature. The tracking component 110 may then detect the feature within the current image using the predicted location and/or orientation. For example, the tracking component 110 may determine that a detected feature that is located at the location (and/or within a threshold distance to the location) and/or includes a similar orientation is the tracked feature. The tracking component 110 may then perform similar processes for one or more other tracked features.

Additionally, or alternatively, in some examples, the tracking component 110 may use scaling and translation to track features between two images when the two images are associated with one or more levels of the pyramid (e.g., the first level, Level 0). To use scaling to track a feature, the tracking component 110 may determine, based on one or more previous detections of the feature, a predicted size of the feature within the current image. The tracking component 110 may then detect the feature within the current image by matching one of the detected features within the current image to the tracked feature based on the scale. In some examples, the tracking component 110 may use both translation and scaling to track features between images associated with the first levels of the pyramids since, as described herein, the images associated with the first levels of the pyramids include the highest resolution and, as such, scaling may be more accurate. Additionally, the tracking component 110 may use both translation and scaling to track the features between the images associated with the first levels of the pyramids since performing both translation and scaling may be more accurate as compared to just using translation.

Figure 3:
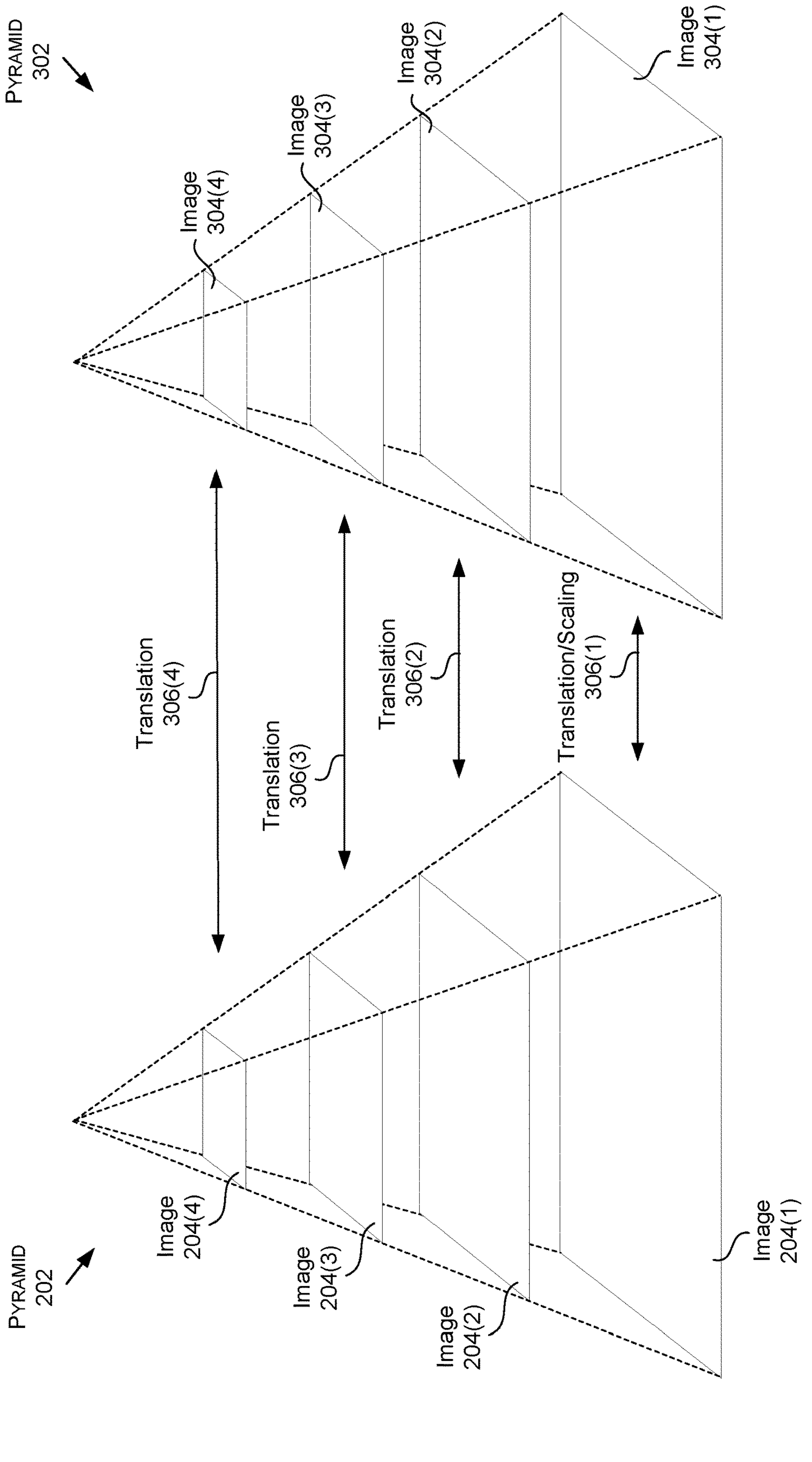
FIG. 3 illustrates an example of performing feature tracking using images that are associated with different scales, in accordance with some embodiments of the present disclosure.

For instance, FIG. 3 is an example of performing feature tracking using images that are associated with different scales, in accordance with some embodiments of the present disclosure. As shown, the tracking component 110 may be performing feature tracking using the pyramid 202, from the example of FIG. 2, and another pyramid 302 that is generated using image data representing a previous image and/or feature list data associated with the image data. In the example of FIG. 3, the pyramid 302 includes a same number of levels as the pyramid 202. For instance, the pyramid 302 includes a first image 304(1) written to the first level, a second image 304(2) written to the second level, a third image 304(3) written to the third level, and a fourth image 304(4) written to the fourth level. The tracking component 110 may then process the images 204(1)-(4) and 304(1)-(4) based on the levels.

For instance, the tracking component 110 may process the first image 204(1) and the first image 304(1) associated with the first level (e.g., Level 0) using both translation and scaling, which is indicated by 306(1). The tracking component 110 may also process the second image 204(2) and the second image 304(2) associated with the second level (e.g., Level 1) using translation, which is indicated by 306(2). Additionally, the tracking component 110 may process the third image 204(3) and the third image 304(3) associated with the third level (e.g., Level 2) using translation, which is indicated by 306(3). Furthermore, the tracking component 110 may process the fourth image 204(4) and the fourth image 304(4) associated with the fourth level (e.g., Level 3) using translation, which is indicated by 306(4).

In some examples, the tracking component 110 may process the images 204(1)-(4) and 304(1)-(4) associated with the levels using an order. For example, the tracking component 110 may process the fourth image 204(4) and the fourth image 304(4) associated with the fourth level first, followed by the third image 204(3) and the third image 304(3) associated with the third level, followed by the second image 204(2) and the second image 304(2) associated with the second level, and finally followed by the first image 204(1) and the first image 304(1) associated with the first level. In such an example, the tracking component 110 may identify first tracked features using the fourth image 204(4) and the fourth image 304(4), then identify second tracked features using the first tracked features (e.g., based on the scaling, the locations (pixel locations) of the first tracked features in the fourth image 204(4)), the third image 204(3), and the third image 304(3), then identify third tracked features using the second tracked features (e.g., based on scaling, the locations (pixel locations) of the second tracked features in the third image 204(3)), the second image 204(2), and then second image 304(2), and then identify fourth tracked features using the third tracked features (e.g., based on scaling, the locations (pixel locations) of the third tracked features in the second image 204(2)), the first image 204(1), and the first image 304(1).

Figure 4:
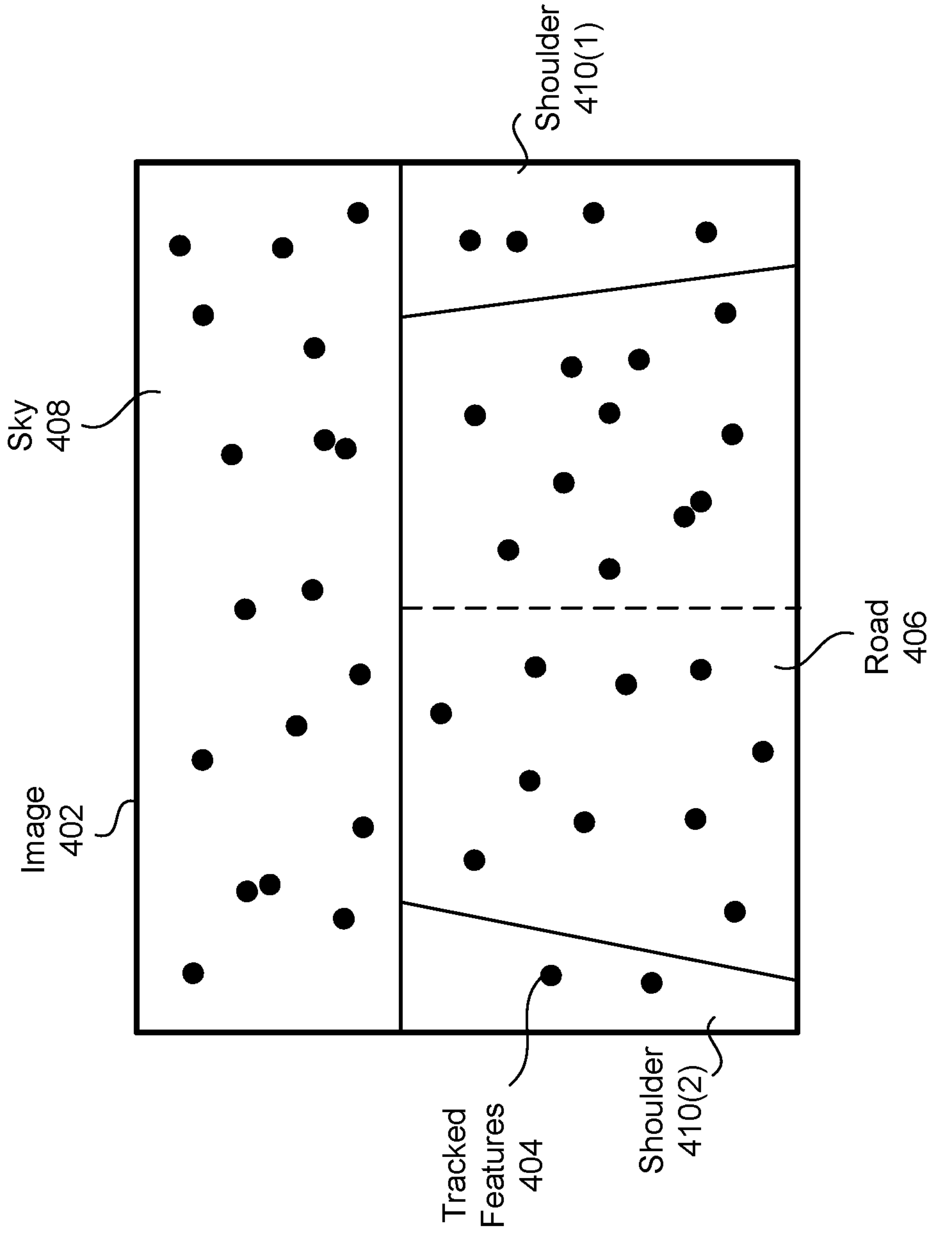
FIG. 4 illustrates an example of tracking features within an image, in accordance with some embodiments of the present disclosure.

FIG. 4 illustrates an example of tracking features within an image 402, in accordance with some embodiments of the present disclosure. As shown, based on performing one or more of the processes described herein, the tracking component 110 may track features 404 (although only one is labeled for clarity reasons) from a previous image(s) to the current image 402. While the example of FIG. 4 illustrates the tracked features 404 as including points within the image 402, in other examples, tracked features may include objects that are tracked from the previous image(s) to the current image 402. For example, the tracked features may include, but are not limited to, pedestrians, vehicles, static features, dynamic actors, road lines, road signs, curbs, structures, and/or any other type of object or feature. Additionally, while the example of FIG. 4 illustrates forty-five tracked features 404, in other examples, the tracking component 110 may track any number of features 404 within the image 402 (e.g., one feature, five features, ten features, one hundred features, one thousand features, four thousand features, ten thousand features, etc.).

As further illustrated in the example of FIG. 4, the tracking component 110 may track features 404 associated with different objects depicted by the image 402. For example, a first portion of the tracked features 404 is associated with a road 406 depicted by the image 402, a second portion of the tracked features 404 is associated with a sky 408 depicted by the image 402, and a third portion of the tracked features 404 is associated with shoulders 410 (1)-(2) of the road 406 as depicted by the image 402. However, in other examples, one or more of the tracked features 404 may be associated with other types of objects depicted by an image (e.g., a vehicle, a pedestrian, etc.).

Referring back to the example of FIG. 1, the process 100 may include a processing component 116 that is configured to process the tracked-feature data 114 in order to generate feature data 118. In some examples, the feature data 118 represents a feature score map indicating at least the locations of tracked feature within an image, the confidence scores associated with the tracked feature, and/or any other information associated with the tracked features. In some examples, the processing component 116 generates the feature data 118 by filtering one or more of the tracked features represented by the tracked-feature data 114. For a first example, the processing component 116 may filter the tracked features by removing one or more tracked features that are located proximate to one or more other tracked features. As described herein, a tracked feature may be located proximate to another tracked feature based on the tracked feature being within a threshold distance to the other tracked feature. In some examples, the threshold distance is a 2D distance while, in other examples, the threshold distance is a 3D distance.

For a second example, the processing component 116 may filter one or more tracked features that are associated with one or more confidence scores that are less than a threshold confidence score. For instance, and as described herein, a confidence score may indicate a likelihood that a detected feature within an image is a tracked feature from a previous image(s). As such, the processing component 116 may remove the tracked feature when the confidence score for the tracked feature is less than the threshold confidence score. In some examples, such as when the confidence scores are within a range (e.g., 0 and 1, 0 and 100, etc.), the threshold confidence score may include any score within the range (e.g., 0.75 when the range is between 0 and 1, 75 when the range is between 0 and 100, etc.).

Figure 5:
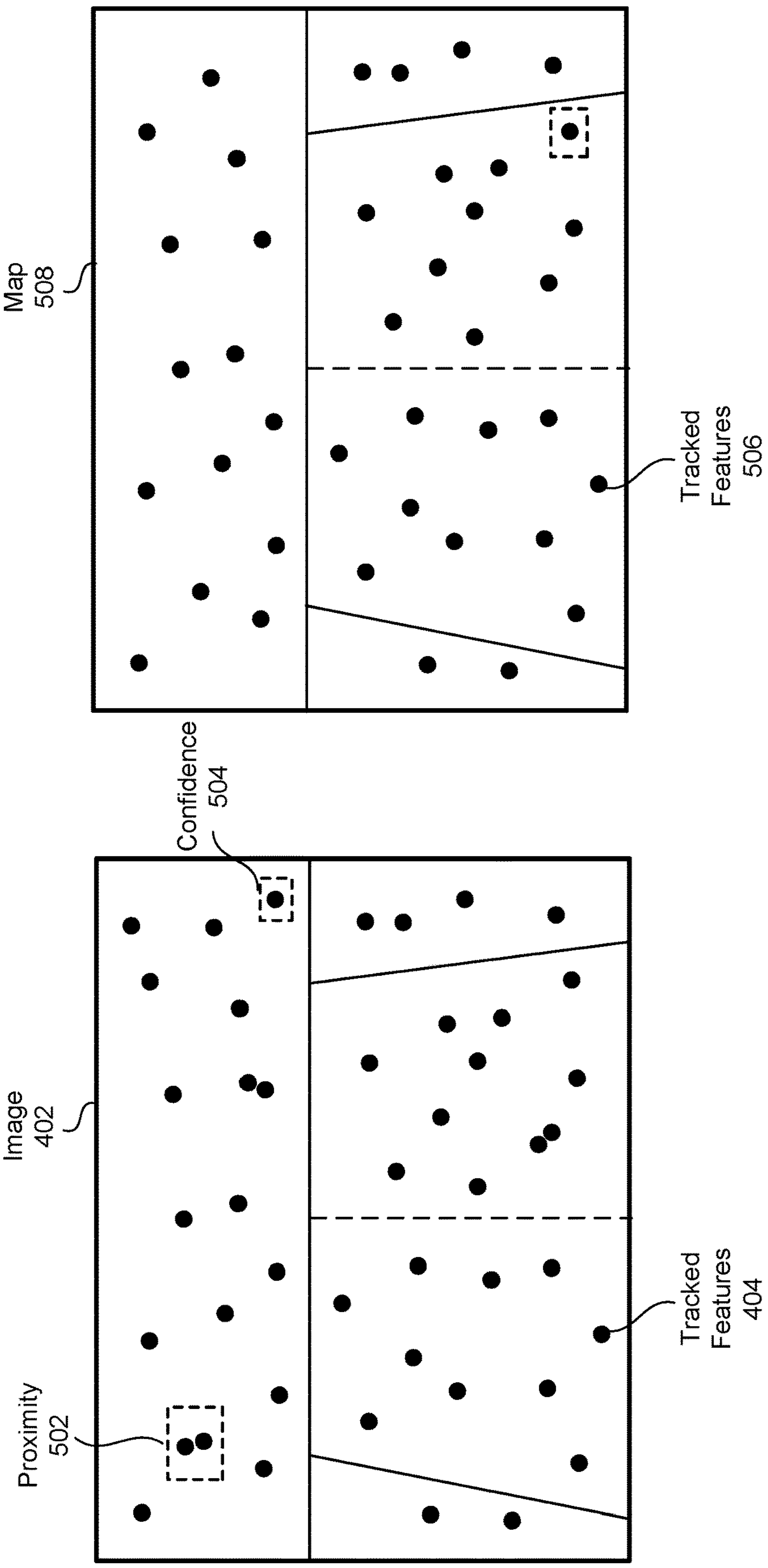
FIG. 5 illustrates an example of filtering tracked features associated with an image, in accordance with some embodiments of the present disclosure.

For instance, FIG. 5 illustrates an example of filtering the tracked features 404 associated with the image 402, in accordance with some embodiments of the present disclosure. As shown, the processing component 116 may identify one or more tracked features 404 that are within proximity 502 to one or more other tracked features 404 (although only one is labeled for clarity reasons). As described herein, the processing component 116 may determine that a tracked feature 404 is within proximity 502 to another tracked feature 404 based on the tracked feature 404 being within a threshold distance (e.g., a threshold number of pixels, etc.) to the other tracked feature 404. Based on identifying tracked features 404 that are within proximity 502 to one another, the processing component 116 may remove one of the tracked features 404. In some examples, the processing component 116 may remove the tracked feature 404 that is associated with the lower confidence score between the two tracked features 404.

In some examples, and as further illustrated by the example of FIG. 5, the processing component 116 may filter the tracked features 404 by removing one or more of the tracked features 404 that are associated with one or more confidence scores 504 (although only one is again labeled for clarity reasons) that are less than a threshold confidence score. In some examples, the output (e.g., the feature data 118) from the processing component 116 may include a list of remaining tracked features 506 (although only one is labeled for clarity reasons), a feature score map 508 associated with the tracked features 508, and/or any other information associated with the tracked features 506. Additionally, in some examples, the processing component 116 may update the confidence scores for the remaining tracked features 506 to include a maximum feature score (e.g., a confidence score of 1 if the range is between 0 and 1). This way, and as described in more detail here, the tracked features 506 will not later be removed when identifying merged features.

Referring back to the example of FIG. 1, the process 100 may include a detection component 120 that is configured to process the processed image data 108 (and/or, in some examples, the image data 104) in order to generate feature data 122. As described herein, the detection component 120 may use one or more techniques for performing the feature detection such as, but not limited to, Harris Corner, SIFT, SURF, FAST, ORB, and/or any other feature detection technique. Additionally, the feature data 122 may represent a list of detected features within the image (e.g., the same image that is associated with the feature data 118), confidence scores associated with the detected features, a feature score map associated with the detected features, and/or any other information associated with the detected features.

In some examples, the detection component 120 may process one or more of the images associated with the pyramid, which is represented by the processed image data 108, when performing feature detection. In some examples, the detection component 120 may process the images using an order that is based on the levels. For instance, and using the example of FIG. 2, the detection component 120 may process the fourth image 204(4) associated with the fourth level 206(4), followed by the third image 204(3) associated with the third level 206(3), followed by the second image 204(2) associated with the second level 206(2), and finally followed by the first image 204(1) associated with the first level 206(1). In such an example, the detection component 120 may identify first detected features using the fourth image 204(4), then identify second detected features using the first detected features (e.g., based on the scaling) and the second image 204(3), then identify third detected features using the second detected features (e.g., based on scaling) and the second image 204(2), and then identify fourth detected features using the third detected features (e.g., based on scaling) and the first image 204(1).

Figure 6:
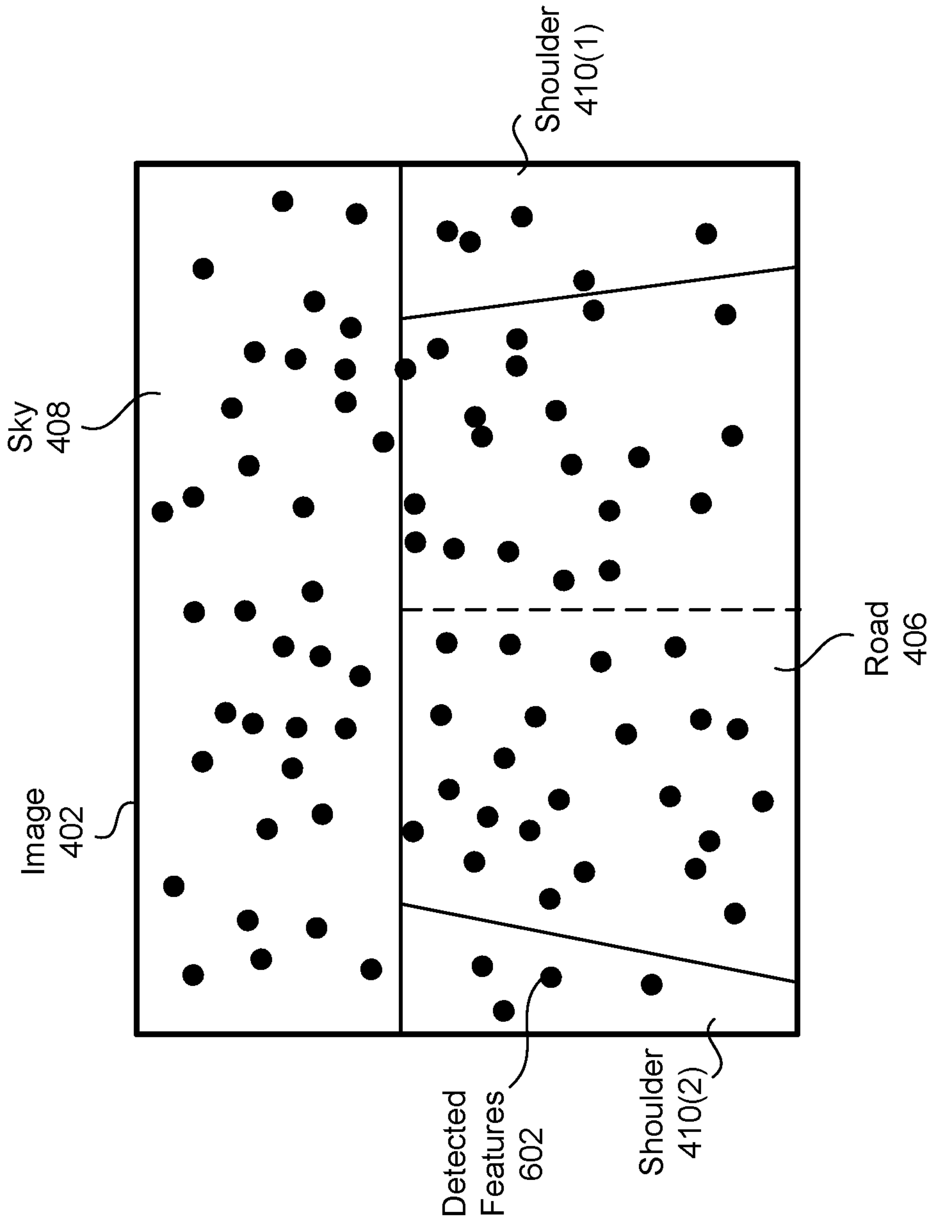
FIG. 6 illustrates an example of detecting features within an image, in accordance with some embodiments of the present disclosure.

For instance, FIG. 6 is an example of detecting features within the image 402, in accordance with some embodiments of the present disclosure. As shown, based on performing one or more of the processes described herein, the detection component 120 may detect features 602 (although only one is labeled for clarity reasons) associated with the image 402 for which the tracking component 110 also tracked features 404. While the example of FIG. 6 illustrates the detected features 602 as including points within the image 402, in other examples, detected features may include objects that are detected within the image 402. For example, the detected features may include, but are not limited to, pedestrians, vehicles, road lines (which are depicted by the image 402), road signs, curbs, structures, and/or any other type of object. Additionally, while the example of FIG. 6 illustrates eighty-seven detected features 602, in other examples, the detection component 120 may detect any number of features 602 within the image 402 (e.g., one detected feature, five detected features, ten detected features, one hundred detected features, one thousand detected features, ten thousand detected features, etc.).

As further illustrated in the example of FIG. 6, the detection component 120 may detect feature 602 associated with different objects depicted by the image 402. For example, a first portion of the detected features 602 are associated with the road 406 depicted by the image 402, a second portion of the detected feature 602 are associated with the sky 408 depicted by the image 402, and a third portion of the detected feature 602 are associated with the shoulders 410(1)-(2) of the road 406 as depicted by the image 402. However, in other examples, one or more of the detected features 602 may be associated with other types of objects depicted by an image (e.g., a vehicle, a pedestrian, etc.).

Referring back to the example of FIG. 1, the process 100 may include a merging component 124 that is configured to process the feature data 118 associated with the tracked features and the feature data 122 associated with the detected features in order to generate feature list data 112. In some examples, to perform the processing, the merging component 124 may initially combine (e.g., merge) the tracked features (e.g., the feature score map) represented by the feature data 118 with the detected features (e.g., the feature score map) represented by the feature data 122. Additionally, when performing the combining, the merging component 124 may perform one or more processes to select features that are associated with one another. For a first example, if a tracked feature represented by the feature data 118 is associated with a detected feature represented by the feature data 122, then the merging component 124 may select one of the tracked feature or the detected feature (e.g., the tracked feature). For a second example, if two features (e.g., two tracked features represented by the feature data 118, two detected features represented by the feature data 122, etc.) are associated with one another, then the merging component 124 may select one of the features, such as the feature that is associated with the highest confidence score.

In some examples, the merging component 124 may determine that two features are associated with one another based on the two features being within a threshold distance to one another. In such examples, the threshold distance may include a 2D distance, such as a threshold number of pixels from one another within an image, or the threshold distance may include a 3D distance, such as a distance within the real-world environment (which is described herein). In some examples, the merging component 124 may assign a higher priority (e.g., higher confidence scores) to the tracked features as compared to the detected features. As such, if a tracked point is associated with a detected point, the merging component 124 may select the tracked point.

Figure 7:
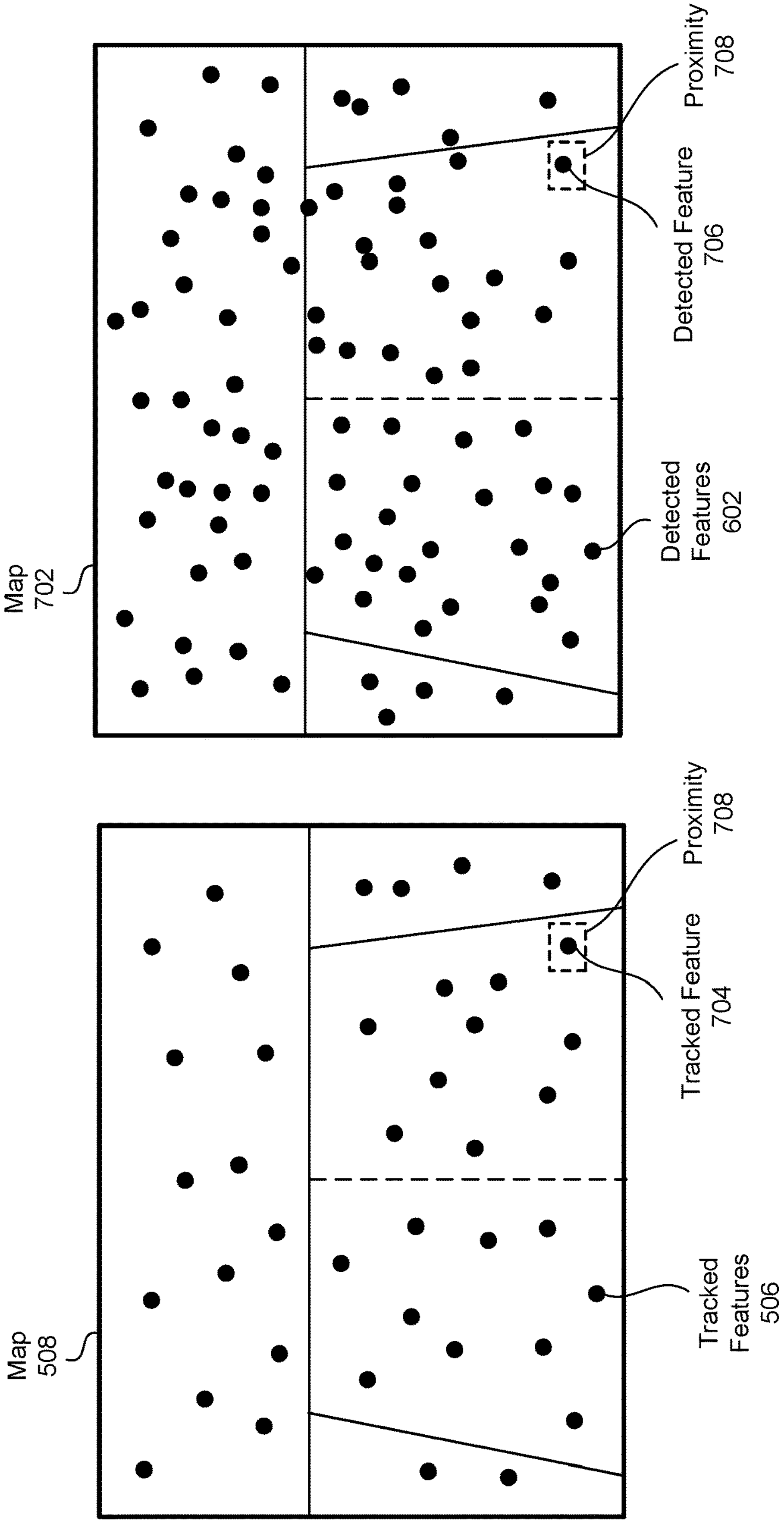
FIG. 7 illustrates an example of combining tracked features with detected features, in accordance with some embodiments of the present disclosure.

For instance, FIG. 7 illustrates an example of combining the tracked features 506 with the detected features 602, in accordance with some embodiments of the present disclosure. As shown, the merging component 124 may process the feature score map 508 associated with the tracked features 506 with respect to a feature score map 702 associated with the detected features 602. Based on the processing, the merging component 124 may determine that one or more of the tracked features 506 are associated with one or more of the detected features 602. For instance, and in the example of FIG. 7, the merging component 124 may determine that at least a tracked feature 704 is associated with a detected feature 706. As described herein, in some examples, the merging component 124 may make the determination based on the tracked feature 704 being within a threshold distance to the detected feature 706, which is indicated by the dashed proximity box 708 (e.g., each of the tracked feature 704 and the detected feature 706 are located within the dashed proximity box 708).

In some examples, the merging component 124 may then select the tracked feature 704 for inclusion within the final merged features. In such examples, the merging component 124 selects the tracked feature 704 over the detected feature 706 since the merging component 124 attempts to keep as many of the tracked features 506 as possible. However, in some examples, the merging component 124 may then select the detected feature 706 for inclusion in the final merged features. Still, in some examples, the merging component 124 may determine the confidence score associated with the tracked feature 704 and the confidence score associated with the detected feature 706. The merging component 124 may then select the feature that is associated with the highest confidence score.

Figure 8:
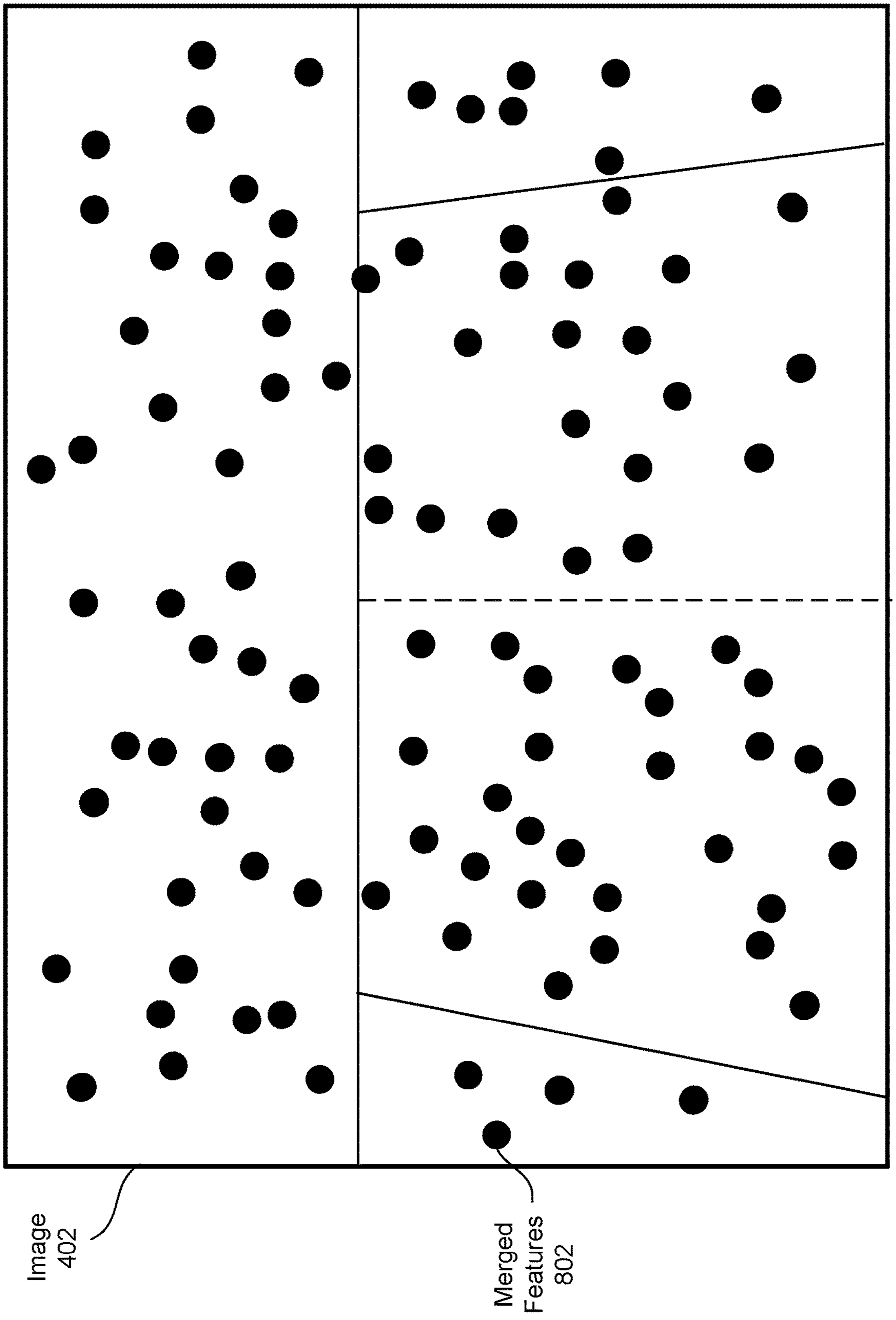
FIG. 8 illustrates an example of merged features associated with an image after tracked features are combined with detected features, in accordance with some embodiments of the present disclosure.

Additionally, FIG. 8 illustrates an example of merged features 802 (although only one is labeled for clarity reasons) associated with the image 402 after the tracked features 506 are combined with the detected features 604, in accordance with some embodiments of the present disclosure. For instance, and as shown, the merged features 802 may include the selected tracked features 506 and the selected detected features 602. While the example of FIG. 8 illustrates one hundred and three merged features 802, in other examples, the merging component 124 may identify any number of merged features associated with the image 402 (e.g., one merged feature, five merged features, ten merged features, one hundred merged features, one thousand merged features, ten thousand merged features, etc.).

Referring back to the example of FIG. 1, in some examples, the merging component 124 may limit the number of the merged features to a threshold number of features. The threshold number of features may include, but is not limited to, ten features, one hundred features, one thousand features, four thousand features, ten thousand features, one million features, and/or any number of features. In such examples, when the number of merged features exceeds the threshold number of features, the merging component 124 may perform one or more processes to select the threshold number of merged features from the merged features. For example, the merging component 124 may select the threshold number of merged features that are associated with the highest confidence scores.

However, in other examples, the merging component 124 may perform additional and/or alternative techniques to select merged features. For instance, and as described herein, the merging component 124 may limit the number of merged features that are located within portions (e.g., cells) of the image. For example, the merging component 124 may partition the image into a number of portions such as, but not limited to, one portion, five portions, ten portions, fifty portions, one hundred portions, and/or any other number of portions. In some examples, the portions may include one or more shapes such as, but not limited to, rectangles, squares, circles, triangles, polygons, and/or any other shape. The merging component 124 may then determine a respective threshold number of features (e.g., maximum number of features) that are allowed for one or more (e.g., each) of the portions of the image. A threshold number of features may include, but is not limited to, one feature, five features, ten features, fifty features, one hundred features, one thousand features, and/or any other number of features. In some examples, the merging component 124 may determine the threshold numbers of features for the portions such that the total number of features for the image still satisfies (e.g., is less than or equal to) a total threshold number of features of the image.

The merging component 124 may use one or more processes in order to determine the threshold number of features within the portions of the image. For instance, in some examples, the merging component 124 may determine that portions of the image that are of importance for the operation of the machine (e.g., the vehicle) performing feature tracking should include a greater number of features than portions of the image that are of less importance for the machine. For example, if the machine is a vehicle and the image depicts both the road and the sky, then the merging component 124 may determine that portions of the image that depict the road should receive a greater number of features than portions of the image that depict the sky. In such an example, the merging component 124 may make this decision based on objects located on the road affecting how the machine operates (e.g., the safety of the machine) more than objects located in the sky. As such, in some examples, the features for merging may be selected first from more important regions of the image (e.g., within a drivable free-space, on or associated with a driving surface, on a sidewalk, etc.) while limiting the merging/tracking of features in other regions (e.g., the sky, grass/gravel/areas away from the driving/walking surfaces, etc.) to only when memory is available.

Additionally, or alternatively, in some examples, the merging component 124 may determine the threshold number of features within the portions of the image based on the application for which the feature tracking is being used. For a first example, if the feature tracking is being used for self-calibration of sensors, then the merging component 124 may more uniformly distribute the features such that each portion includes a substantially similar threshold number of features. This is because having the features more uniformly distributed across the image may improve the self-calibration of the sensors. For a second example, if the feature tracking is being used for object tracking, then the merging component 124 may determine that portions of the image that depict and/or will likely depict dynamic objects should receive a greater number of features than portions of the image that do not depict and/or will likely not depict dynamic objects. Still, for a third example, if the feature tracking is being used for visual odometry (e.g., tracking movement of the vehicle using perception and/or sensor data from other sensors—such as speed sensors), then the merging component 124 may determine that portions of the image that depict and/or will likely depict static objects should receive a greater number of features than portions of the image that do not depict and/or will likely not depict static objects. While these are just a couple example applications for which the feature tracking may be used, in other examples, the feature tracking may be used for additional and/or alternative applications.

In some examples, the merging component 124 may use the same feature distribution for each of the images represented by the image data 104. However, in other examples, the merging component 124 may determine a respective distribution for one or more of the images represented by the image data 104 (e.g., the determination is made per frame). In such examples, the merging component may determine the distribution for an image based on the objects depicted by the image.

The merging component 124 may then use the distribution of the features associated with the portions to select merged features. For instance, and for a portion, the merging component 124 may determine the number of features within the portion. If the number of features is greater than the threshold number of features associated with the portion, then the merging component 124 may select a portion of the merged features (e.g., a portion that is equal to the threshold number of features) for inclusion in the final merged features, such as the portion of the merged features that are associated with the highest confidence scores. Additionally, if the number of features is equal to the threshold number of features, then the merging component 124 may select the merged features (e.g., all of the merged features) for inclusion in the final merged features. Furthermore, if the number of features is less than the threshold number of features, then the merging component 124 may again select the merged features (e.g., all of the merged features) for inclusion in the final merged features. Additionally, in some examples, the merging component 124 may determine a difference between the number of features and the threshold number of features and then allocate that difference to one or more other portions of the image.

For example, the merging component 124 may analyze the portions of the image in order to identify portions of the image where there are less merged features than the threshold numbers of features associated with the portions. The merging component 124 may then determine a respective difference between the number of merged features within a portion (e.g., each portion) and the threshold number of features associated with the portion. Additionally, the merging component 124 may determine a total difference based on the differences (e.g., by adding the differences). The merging component 124 may then allocate the total difference of features to other portions of the image for which the numbers of merged features are greater than the threshold numbers of features. In some examples, the merging component 124 may perform one or more processes to perform the allocation.

For a first example, the merging component 124 may evenly distribute the total difference of features to the portions of the image for which the numbers of features are greater than the threshold numbers of features. For a second example, the merging component 124 may distribute a greater portion of the total difference of features to portions of the image that are of greater importance to the machine performing the feature tracking (which is discussed herein) as compared to portions of the image that are of less importance to the machine.

Figure 9:
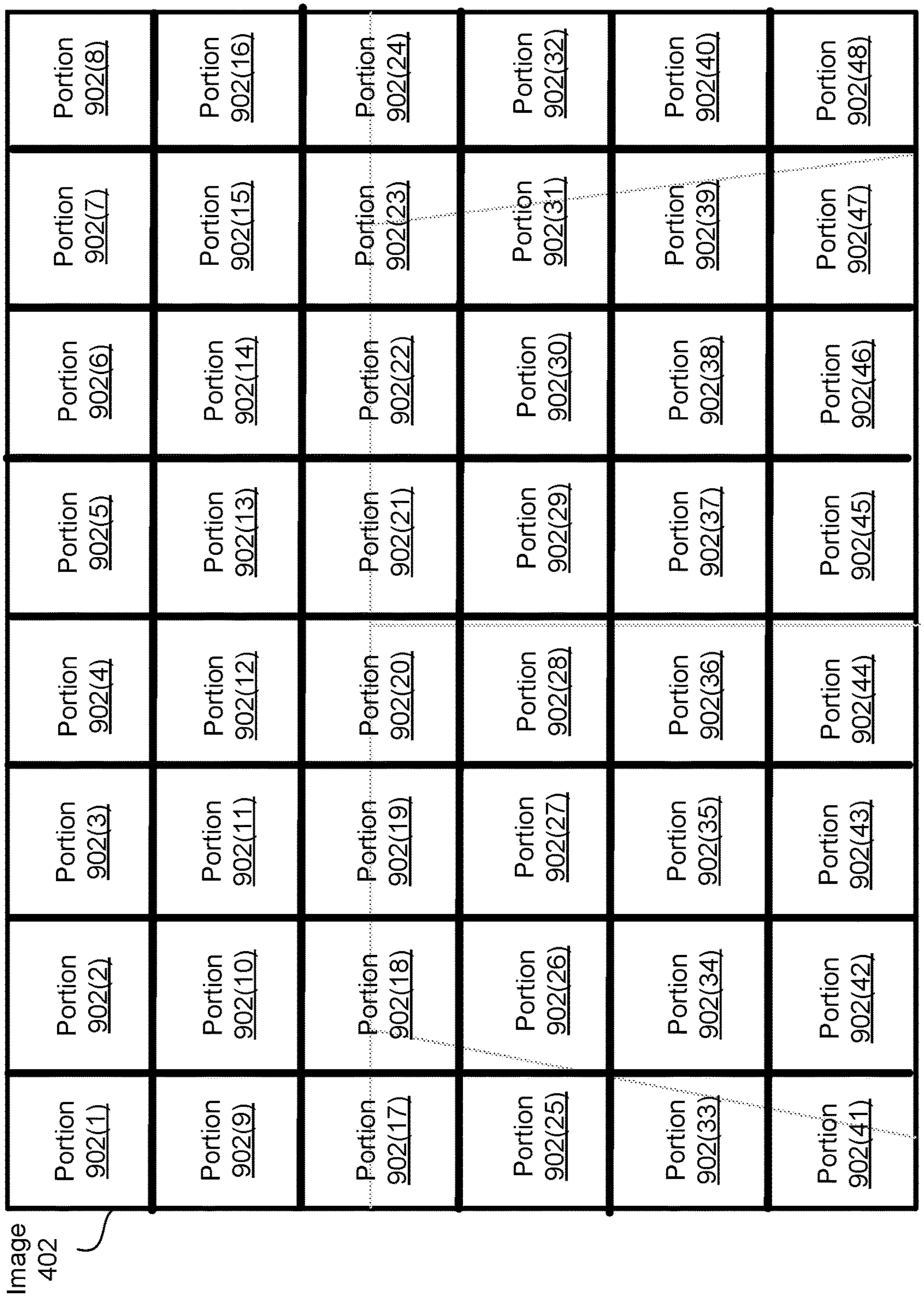
FIG. 9 illustrates an example of partitioning an image into various portions, in accordance with some embodiments of the present disclosure.

For instance, FIG. 9 illustrates an example of partitioning the image 402 into various portions 902(1)-(48) (also referred to singularly as "portion 902" or in plural as "portions 902"), in accordance with some embodiments of the present disclosure. In the example of FIG. 9, the merging component 124 may partition the image 402 into forty-eight portions 902, where the portions 902 include squares that are evenly distributed across the image 402. However, in other examples, the merging component 124 may partition the image 402 into any other number of portions, the portions may include any other shape, and/or the portions may include any other type of distribution across the image 402.

The merging component 124 may then determine a respective threshold number of features associated with one or more (e.g., each) of the portions 902. For a first example, the merging component 124 may determine that the portions 902(18)-(26), 902(26)-(31), 902(34)-(39), and 902(42)-(47) of the image 402 that depict the road 406 should include a greater number of the merged features 802 as compared to the portions 902(1)-(16) of the image 402 that depict the sky 408 and/or the portions 902(17), 902(24)-(25), 902(32)-(33), 902(40)-(41), and 902(48) of the image 402 that depict the shoulders 410((1)-(2). For a second example, the merging component 124 may determine that each of the portions 902 of the image 402 should include the same number of merged features 802. Still, for a third example, the merging component 124 may use a distribution, such as a Gaussian distribution. While these are just a few example distributions that the merging component 124 may determine for the portions 902 of the image 402, in other examples, the merging component 124 may determine additional and/or alternative distributions for the portions 902 of the image 402.

Figure 10A:
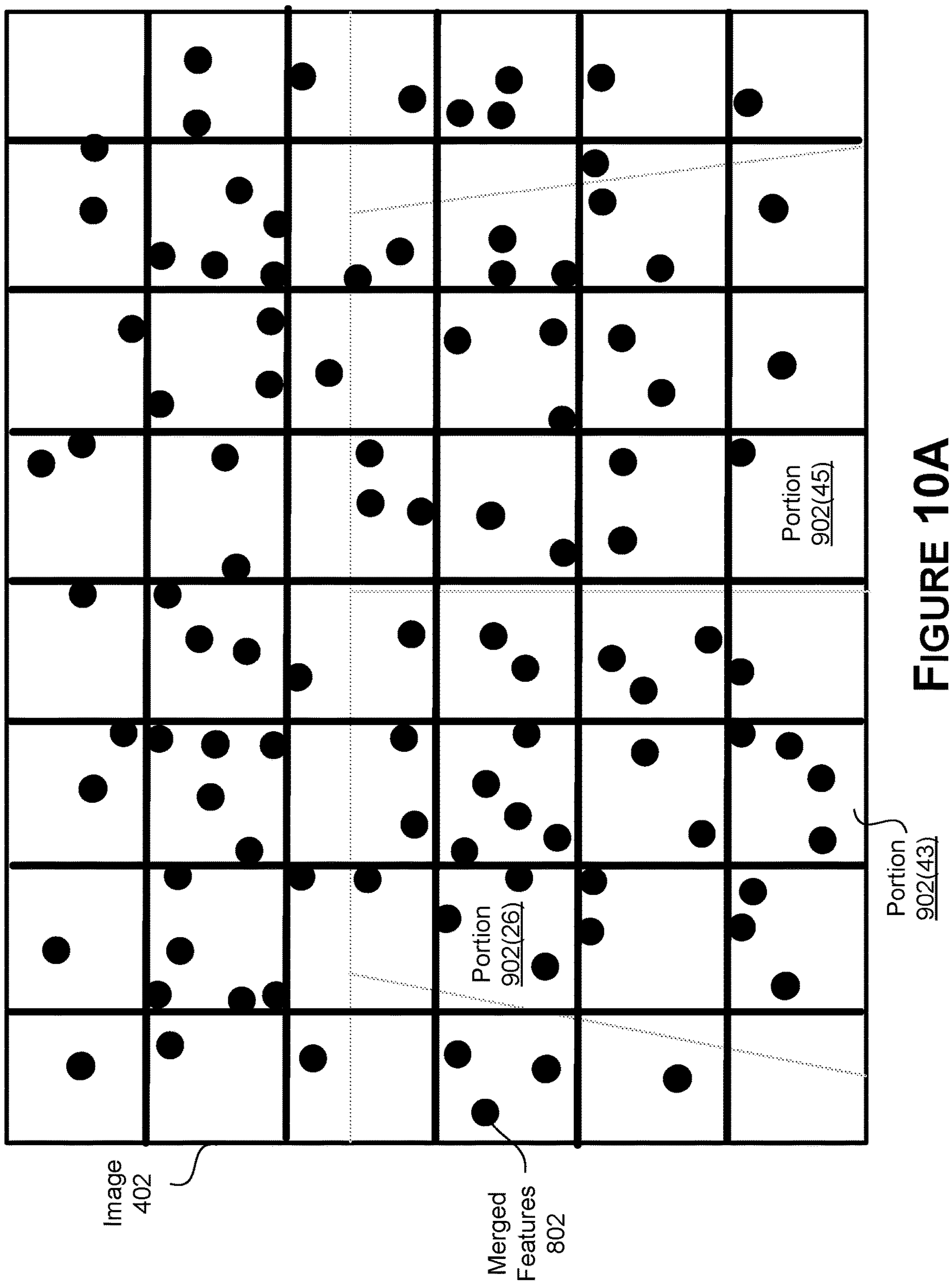
FIGS. 10A-10B illustrate an example of using a distribution associated with merged features to select final merged features associated with an image, in accordance with some embodiments of the present disclosure.
Figure 10B:
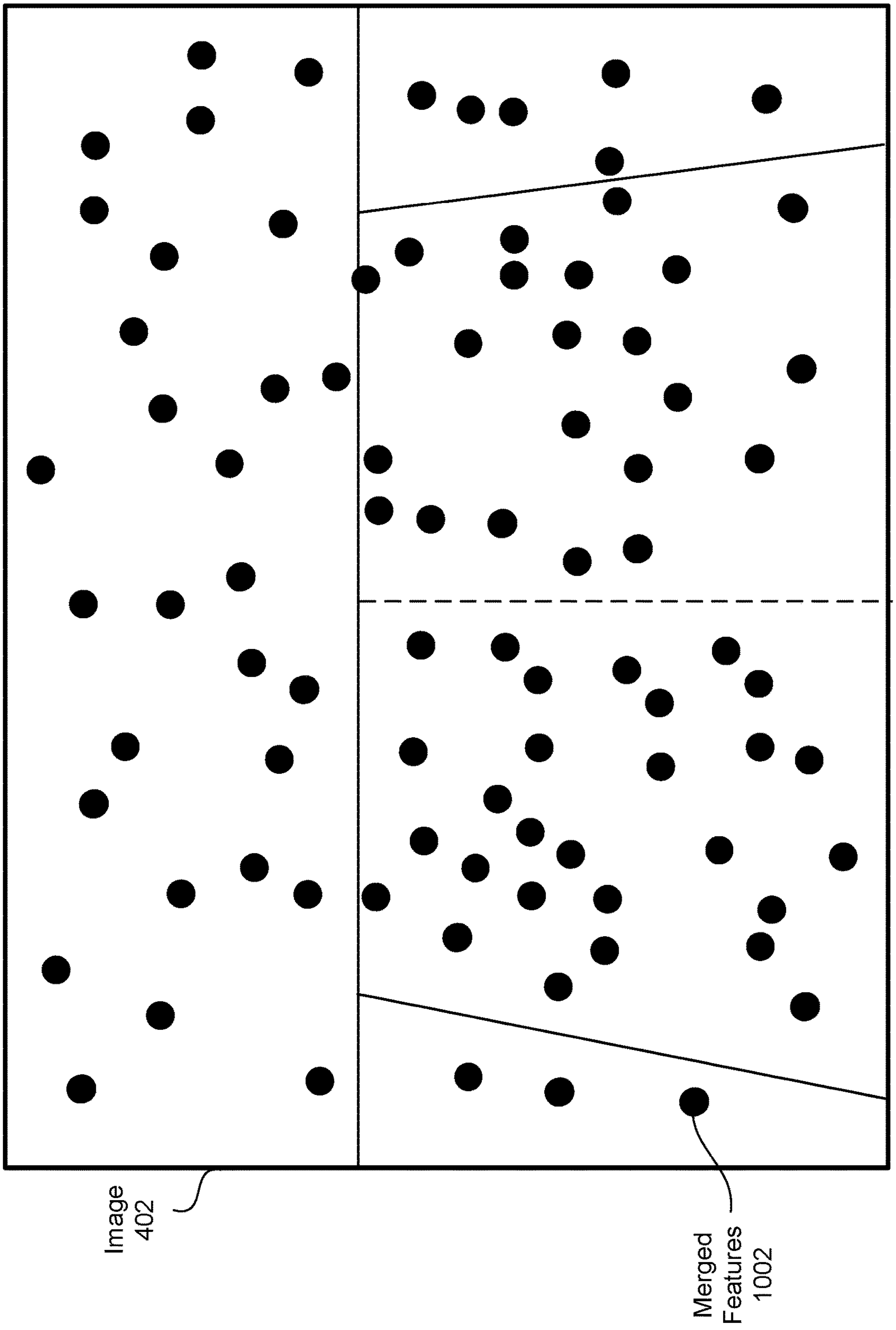

FIGS. 10A-10B illustrate an example of using a distribution associated with the merged features 802 to select final merged features associated with the image 402, in accordance with some embodiments of the present disclosure. As described above, the merging component 124 may identify at least one portion 902 of the image 402 that includes a number of merged features 802 that is equal to the threshold number of features for the portion 902. For instance, and in the example of FIG. 10A, the merging component 124 may determine that the portion 902(26) of the image 402 is associated with a threshold number of features that includes three features. As such, the merging component 124 may select all of the merged features 802 within the portion 902(26) of the image 402 to be included in the final merged features.

The merging component 124 may also identify at least one portion 902 of the image 402 that includes a number of merged features 802 that is less than the threshold number of features for the portion 902. For instance, and in the example of FIG. 10A, the merging component 124 may determine that the portion 902(45) of the image 402 is associated with a threshold number of features that includes two features. As such, the merging component 124 may select the merged features 802 within the portion 902(45) to be included in the final merged features. The merging component 124 may also identify at least one portion 902 of the image 402 that includes a number of merged features 802 that is greater than the threshold number of features for the portion 902. For instance, and in the example of FIG. 10A, the merging component 124 may determine that the portion 902(43) of the image 402 is associated with a threshold number of features that includes two features. As such, the merging component 124 may select two of the merged features 802 within the portion 902(43) to be included in the final merged features. In some examples, the merging component 124 selects the two merged features 802 that are associated with the two highest confidence scores.

In some examples, the merging component 124 may then determine to reallocate a difference between the number of merged features 802 associated with the portion 902(45) and the threshold number of features associated with the portion

902(45) to another portion 902, such as the portion 902(43). For instance, and in the example of FIG. 10A, the difference may include one feature. As such, the merging component 124 may determine that a new threshold number of features for the portion 902(43) includes three features. Because of this, instead of only selecting two of the merged features 802 from the portion 902(43), the merging component 124 may select three of the merged features 802 from the portion 902(43) to be included in the final merged features. The merging component 124 may then continue to perform these processes for each of the portions 902 of the image 402.

As shown by the example of FIG. 10B, based on performing the processes of FIG. 10A, the merging component 124 may determine final merged features 1002 associated with the image 402. In the example of FIGS. 10A-10B, the merging component 124 may have determined the final merged features 1002 by removing more of the merged features 802 associated with the portions 902(1)-(16) as compared to the merged features 802 associated with the portions 902(17)-(48). As described herein, the merging component 124 may have removed more of the merged features 802 associated with the portions 902(1)-(16) based on the portions 902(1)-(16) depicting the sky, which is of less importance for the application of the feature tracker. Additionally, by limiting the number of final merged features 1002 that the feature tracker is tracking, the feature tracker may more efficiently track features that are important to the application of the feature tracker.

Referring back to the example of FIG. 1, the process 100 may include the merging component 124 outputting feature list data 112 associated with the final merged features. For example, the feature list data 112 may represent identifiers associated with the final merged features, a timestamp indicating when the final merged features were detected, timestamps indicating durations of how long tracked features from the final merged features have been tracked, confidence scores associated with the final merged features, and/or any other information associated with the final merged features. As described herein, in some examples, the merging component 124 may then output the feature list data 112 to one or more systems 126 of the machine for which the feature tracker is operating. The system(s) 126 may include, but is not limited to, a system 126 that performs object detection, a system 126 that further performs object tracking, a system 126 that performs route planning, a system 126 that performs sensor calibration, a system 126 that determines information (e.g., a time-to-collision) to objects, and/or any other type of system.

Additionally, in some examples, and as illustrated by the example of FIG. 1, the merging component 124 may send the feature list data 112 to the tracking component 110 so that the tracking component 110 may continue to track features within images represented by the image data 104. For instance, and for a new image represented by the image data 104, the tracking component 110 may use the feature list data 112 and the image data 104 to identify tracked features associated with the new image, using one or more of the processes described herein. In other words, the process 100 may continue to repeat as the image sensor(s) 106 continues generating the image data 104 such that the process 100 is able to track features over a period of time, detect new features over the period of time, and/or terminate tracks associated with features over the period of time.

Figure 11:
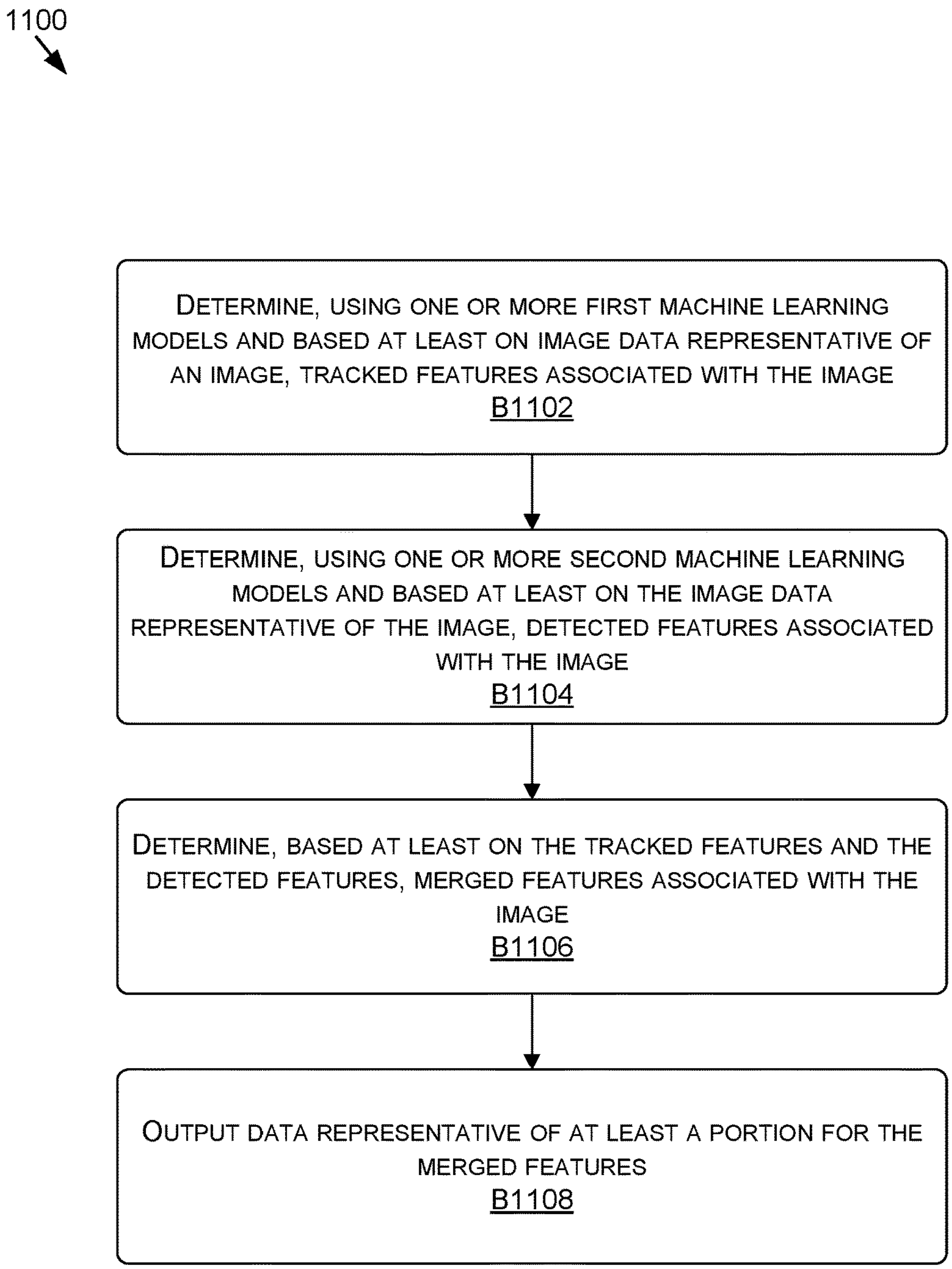
FIG. 11 illustrates a flow diagram showing a method for tracking features using detected features and tracked features, in accordance with some embodiments of the present disclosure.
Figure 12:
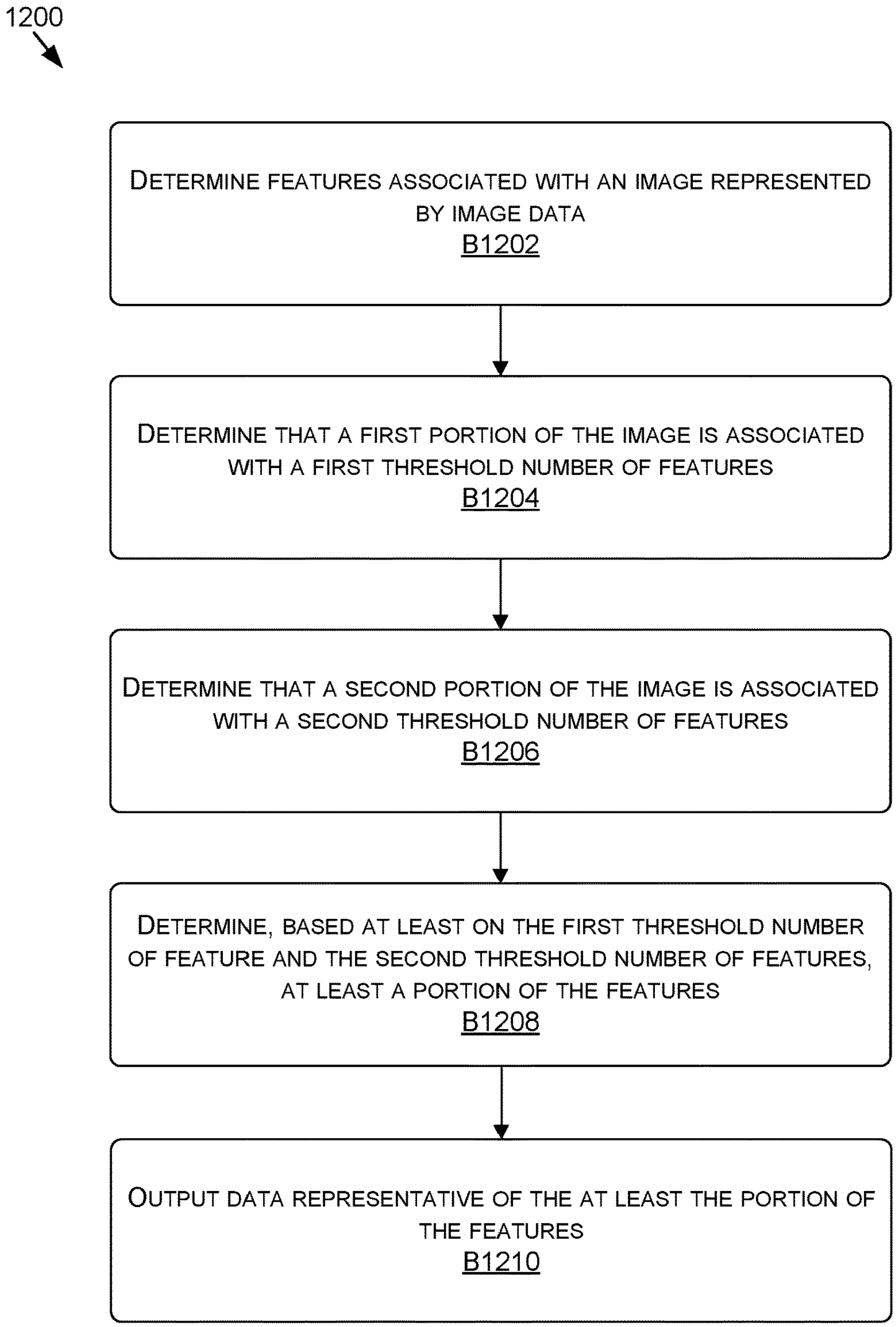
FIG. 12 illustrates a flow diagram showing a method for determining a final list of tracked features, in accordance with some embodiments of the present disclosure.

Now referring to FIGS. 11-12, each block of methods 1100 and 1200, described herein, comprises a computing process that may be performed using any combination of hardware, firmware, and/or software. For instance, various functions may be carried out by a processor executing instructions stored in memory. The methods 1100 and 1200 may also be embodied as computer-usable instructions stored on computer storage media. The methods 1100 and 1200 may be provided by a standalone application, a service or hosted service (standalone or in combination with another hosted service), or a plug-in to another product, to name a few. In addition, the method 1100 and 1200 are described, by way of example, with respect to FIG. 1. However, these methods 1100 and 1200 may additionally or alternatively be executed by any one system, or any combination of systems, including, but not limited to, those described herein.

FIG. 11 is a flow diagram showing a method 1100 for tracking features using detected features and tracked features, in accordance with some embodiments of the present disclosure. The method 1100, at block B1102, may include determining, using one or more first machine learning models and based at least on image data representative of an image, tracked features associated with the image. For instance, the tracking component 110 may process the image data 104 generated using the image sensor(s) 106 (and/or the processed image data 108 generated by the processing component 102 using the image data 104) and the feature list data 112 representing features associated with a previous image. Based on the processing, the tracking component 110 may determine the tracked features associated with the image. In some examples, the tracking component 110 may determine additional information associated with the tracked features, such as confidence scores associated with the tracked features. The tracking component 110 may then output the tracked-feature data 114 representing the tracked features and/or the confidence scores.

The method 1100, at block B1104, may include determining, using one or more second machine learning models and based at least on the image data representative of the image, detected features associated with the image. For instance, the detection component 120 may also process the image data 104 generated using the image sensor(s) 106 (and/or the processed image data 108 generated by the processing component 102 using the image data 104). Based on the processing, the detection component 120 may determine the detected features associated with the image. In some examples, the detection component 120 may determine additional information associated with the detected features, such as confidence scores associated with the detected features. The detection component 120 may then output the feature data 122 representing the detected features and/or the confidence scores.

The method 1100, at block B1106, may include determining, based at least on the tracked features and the detected features, merged features associated with the image. For instance, the merging component 124 may process the tracked-feature data 114 (and/or the feature data 118 generated by the processing component 116 using the tracked-feature data 114) and the feature data 122. Based on the processing, the merging component 124 may determine the merged features associated with the image. In some examples, the merging component 124 may perform additional processes to determine the merged features. For example, the merging component 124 may limit the number of merged features to a threshold number of merged features and/or limit portions of the image to threshold numbers of merged features.

The method 1100, at block B1108, may include outputting data representative of at least a portion of the merged features. For instance, the merging component 124 may output by the feature list data 112 representing at least identifiers for the merged features. In some examples, the method 1100 may then continue to repeat, but with using the tracking component 110 using the feature list data 112, to continue tracking features within images represented by the image data 104.

FIG. 12 is a flow diagram showing a method 1200 for determining a final list of tracked features, in accordance with some embodiments of the present disclosure. The method 1200, at block B1202, may include determining features associated with an image represented by image data. For instance, the merging component 124 may use the feature data 118 associated with the tracked features and the feature data 122 associated with the detected features in order to determine the merged features associated with the image.

The method 1200, at block B1204, may include determining that a first portion of the image is associated with a first threshold number of features. For instance, the merging component 124 may determine that the first portion of the image is associated with the first threshold number of features. In some examples, the merging component 124 determines the first threshold number of features based on the application for which the feature tracker is being used, the location of the first portion within the image, the object(s) depicted by the first portion of the image, an even distribution of the merged features within the image, and/or using one or more additional and/or alternative techniques.

The method 1200, at block B1206, may include determining that a second portion of the image is associated with a second threshold number of features. For instance, the merging component 124 may determine that the second portion of the image is associated with the second threshold number of features. In some examples, the merging component 124 determines the second threshold number of features based on the application for which the feature tracker is being used, the location of the second portion within the image, the object(s) depicted by the second portion of the image, an even distribution of the merged features within the image, and/or using one or more additional and/or alternative techniques. In some examples, the second threshold number of features is equal to the first threshold number of features. In some examples, the second threshold number of features is different than (e.g., less than or greater than) the first threshold number of features.

The method 1200, at block B1208, may include determining, based at least on the first threshold number of features and the second threshold number of features, at least a portion of the features. For instance, the merging component 124 may determine the at least the portion of the merged features based on the first threshold number of features and the second threshold number of features. As described herein, the merging component 124 may make the determination based on comparing the actual number of features included within the first portion of the image to the first threshold number of features and the actual number of features included in the second portion of the image to the second threshold number of features. The merging component 124 may then select the at least the portion of the merged features based on the comparing.

The method 1200, at block B1210, may include outputting data representative of the at least a portion of the merged features. For instance, the merging component 124 may output by the feature list data 112 representing at least identifiers for the at least the portion of the merged features.

Example Autonomous Vehicle

Figure 13A:
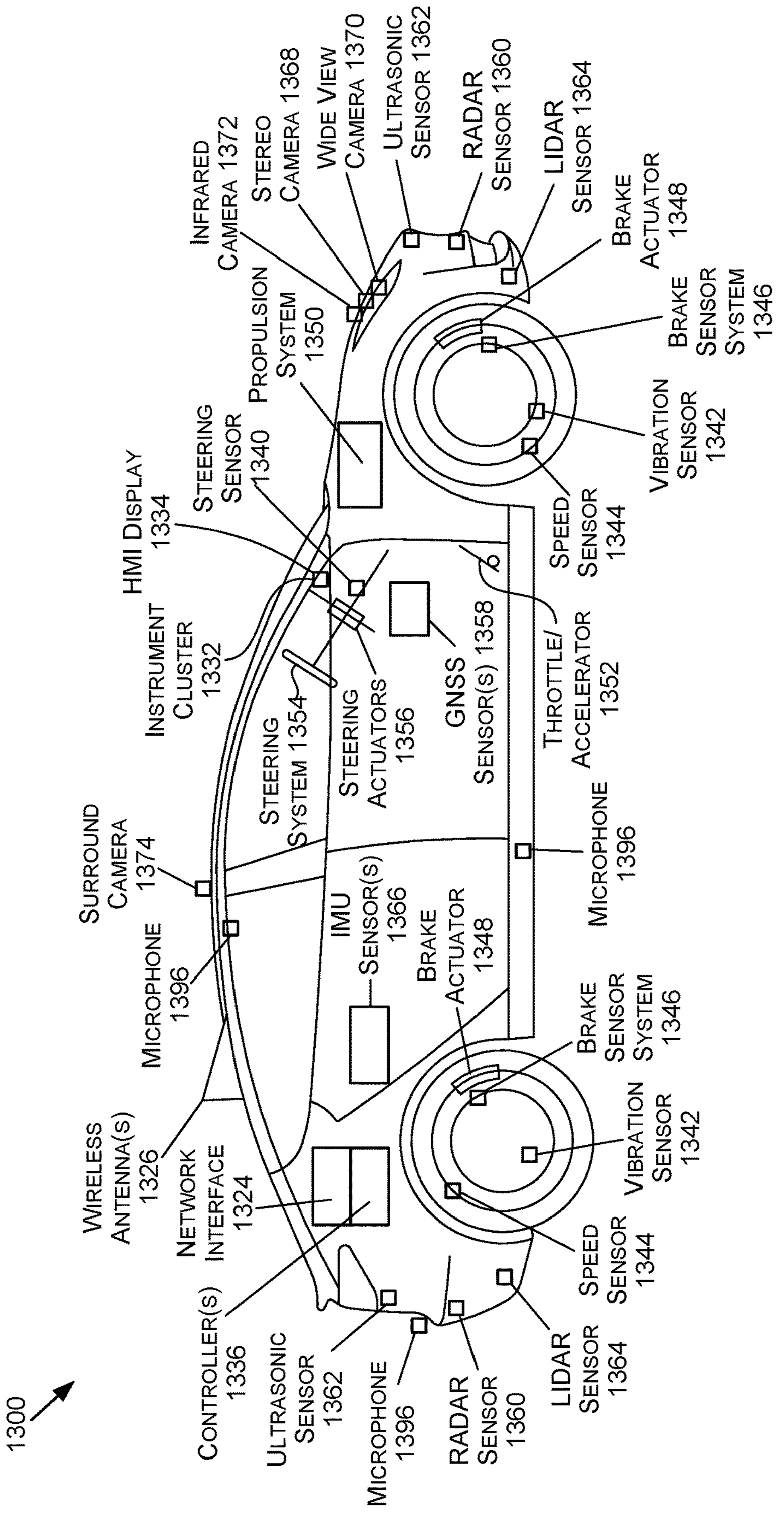
FIG. 13A is an illustration of an example autonomous vehicle, in accordance with some embodiments of the present disclosure.

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. The vehicle 1300 may be capable of functionality in accordance with one or more of Level 1-Level 5 of the autonomous driving levels. For example, the vehicle 1300 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1300 or other machine, such as being fully autonomous, being highly autonomous, being conditionally autonomous, being partially autonomous, providing assistive autonomy, being semi-autonomous, being primarily autonomous, or other designation.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems ("GNSS") sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree Cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the High Definition ("HD") map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over Long-Term Evolution ("LTE"), Wideband Code Division Multiple Access ("WCDMA"), Universal Mobile Telecommunications System ("UNITS"), Global System for Mobile communication ("GSM"), IMT-CDMA Multi-Carrier ("CDMA2000"), etc. The wireless antenna(s) 1326 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 13B:
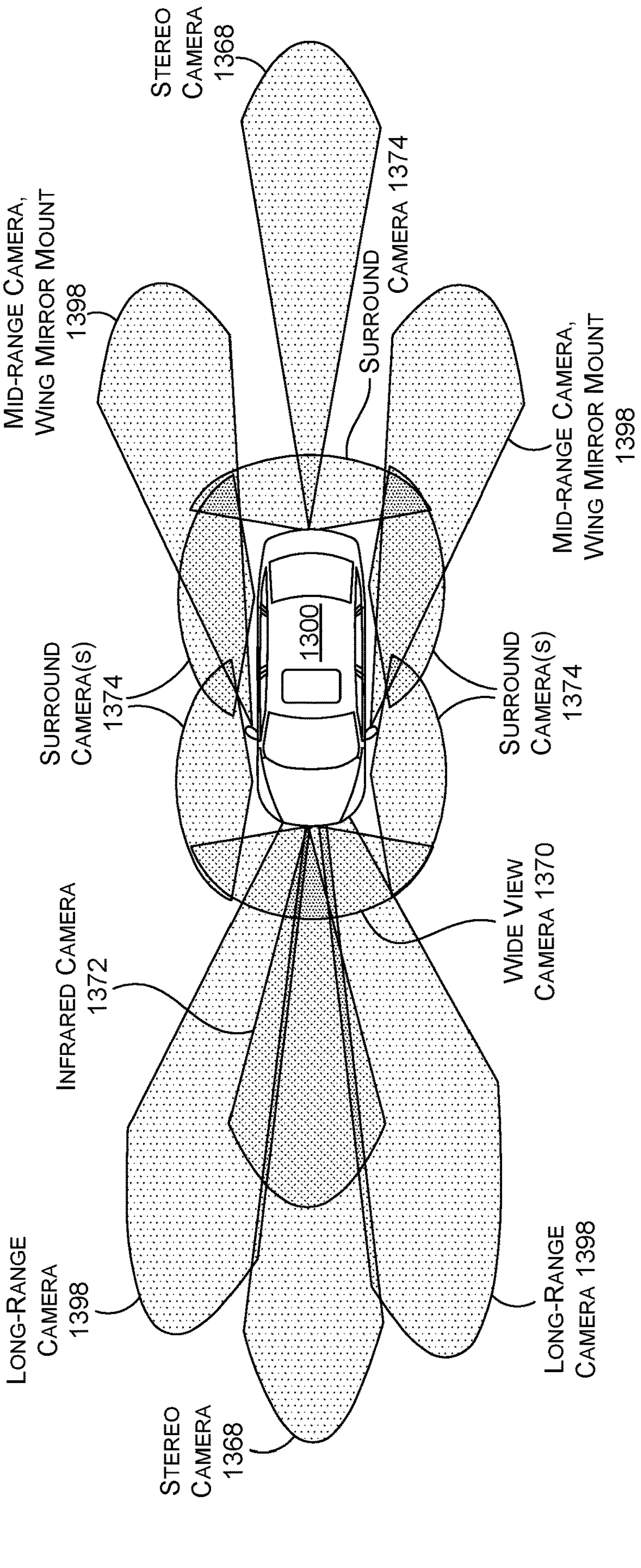
FIG. 13B is an example of camera locations and fields of view for the example autonomous vehicle of FIG. 13A, in accordance with some embodiments of the present disclosure.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may be any number (including zero) of wide-view cameras 1370 on the vehicle 1300. In addition, any number of long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

Any number of stereo cameras 1368 may also be included in a front-facing configuration. In at least one embodiment, one or more of stereo camera(s) 1368 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree Camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

Figure 13C:
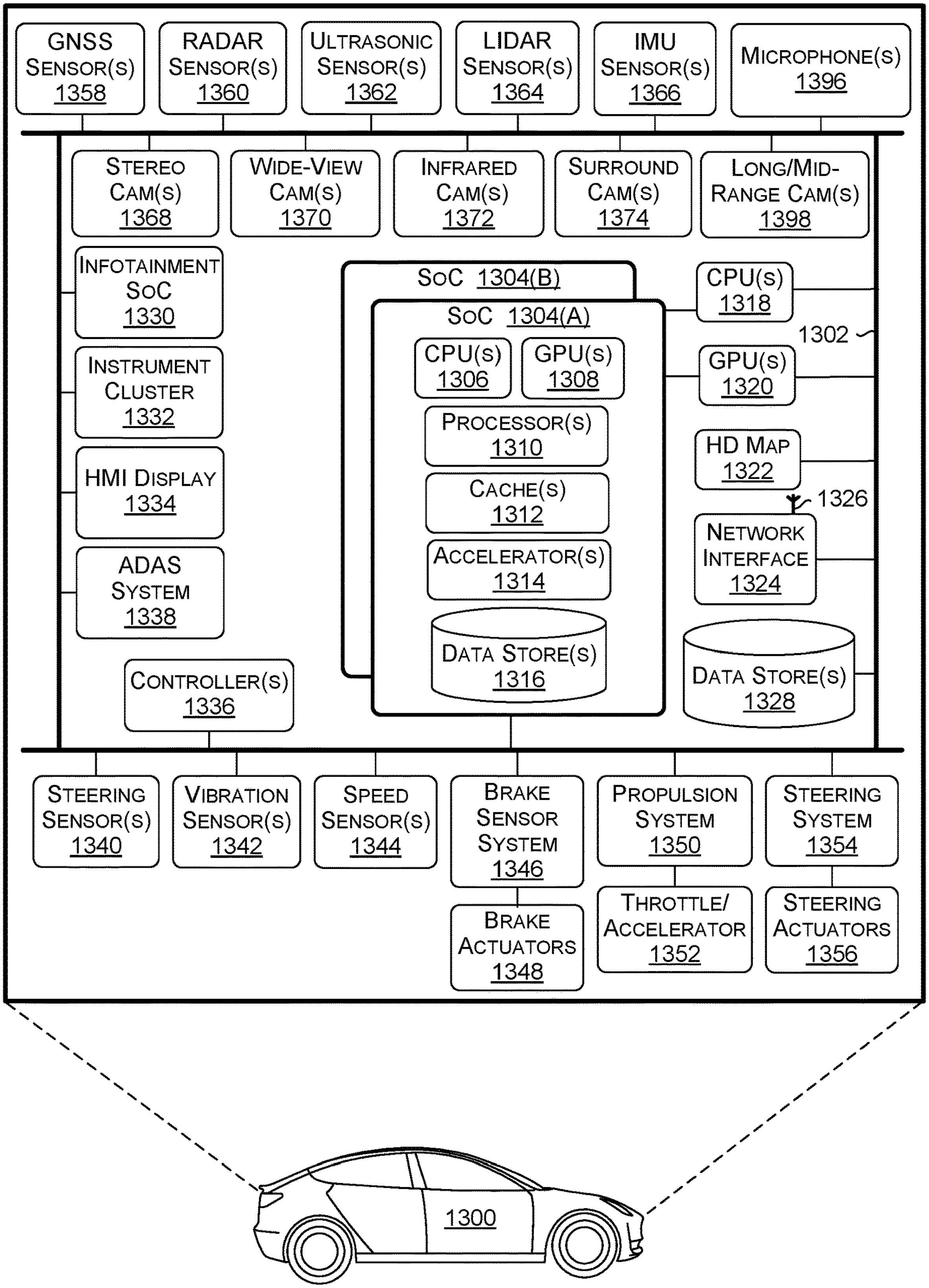
FIG. 13C is a block diagram of an example system architecture for the example autonomous vehicle of FIG. 13A, in accordance with some embodiments of the present disclosure.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s) 1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include an arithmetic logic unit(s) (ALU(s)) which may be leveraged in performing processing with respect to any of the variety of tasks or operations of the vehicle 1300—such as processing DNNs. In addition, the SoC(s) 1304 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1306 and/or GPU(s) 1308.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS, assisted GPS sensors, differential GPS (DGPS) sensors, etc.), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree Field of view. Commercially available LIDAR sensor(s) 1364 may have an advertised range of approximately 1300 m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 120-degree horizontal and 35-degree vertical field-of-view, with a 200 m range even for low-reflectivity objects. Front-mounted LIDAR sensor(s) 1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

Figure 13D:
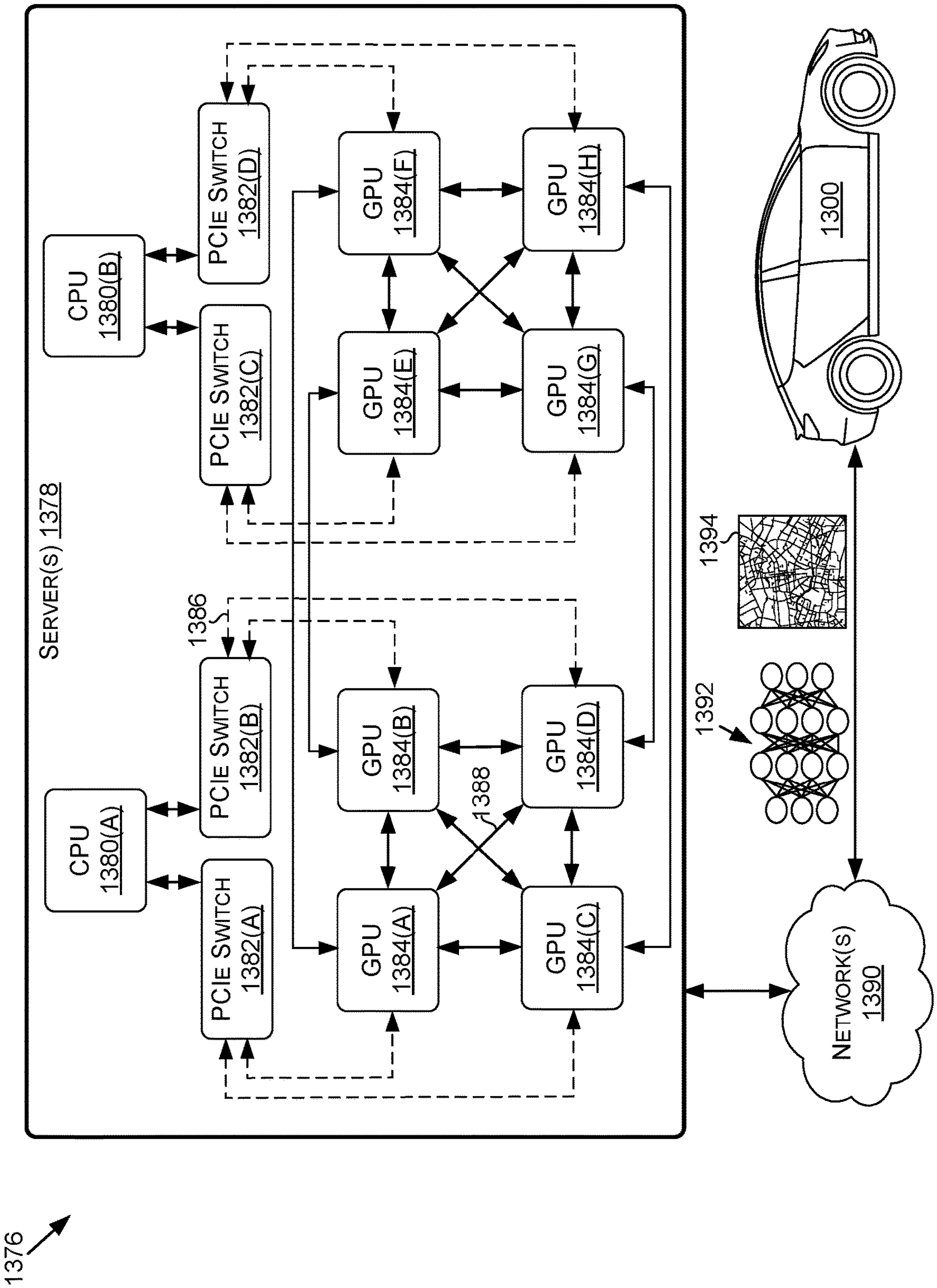
FIG. 13D is a system diagram for communication between cloud-based server(s) and the example autonomous vehicle of FIG. 13A, in accordance with some embodiments of the present disclosure.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server (s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU (s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 14:
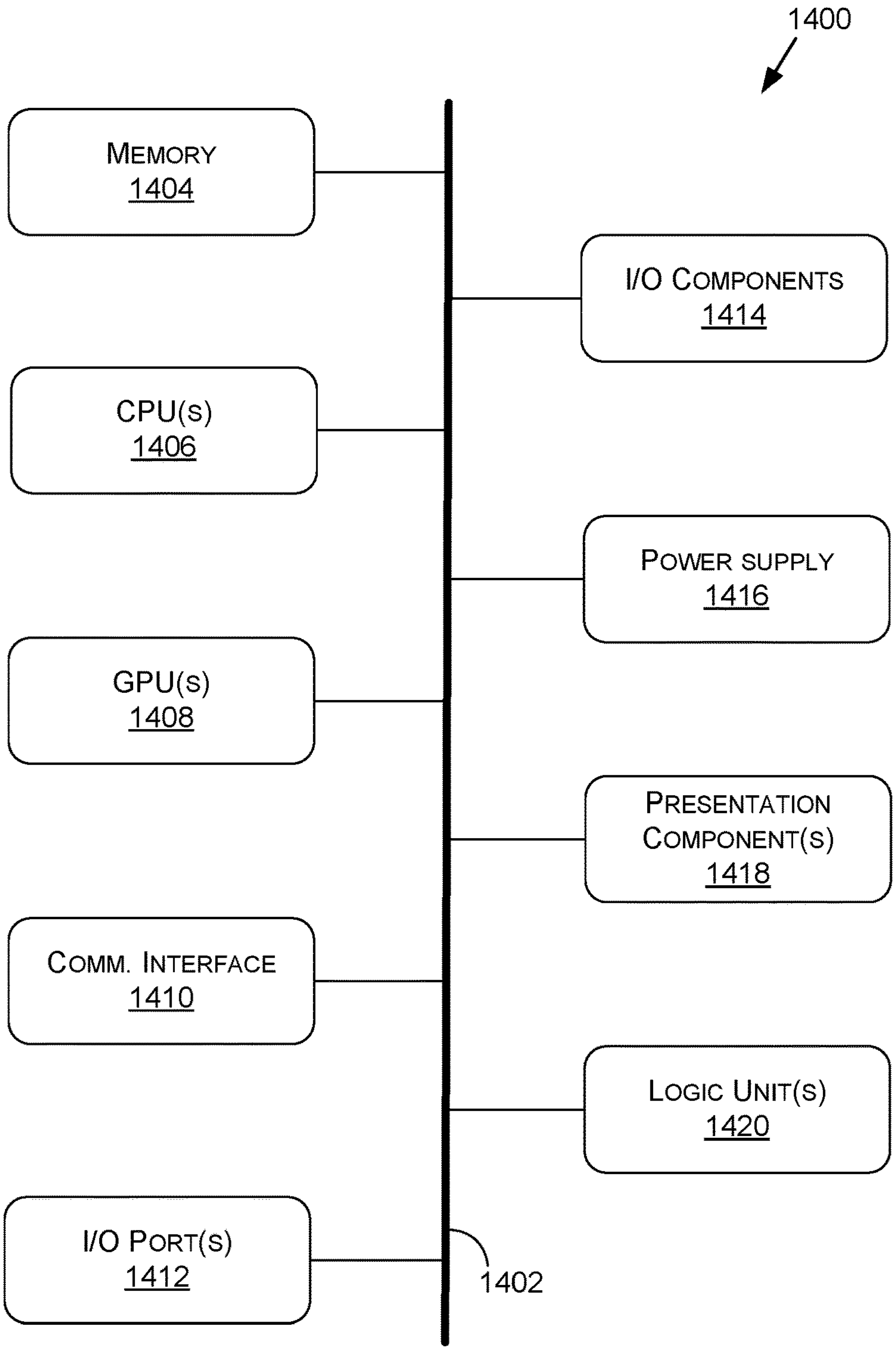
FIG. 14 is a block diagram of an example computing device suitable for use in implementing some embodiments of the present disclosure.

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1420 and/or communication interface 1410 may include one or more data processing units (DPUs) to transmit data received over a network and/or through interconnect system 1402 directly to (e.g., a memory of) one or more GPU(s) 1408.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, DPUs, etc.), and output the data (e.g., as an image, video, sound, etc.).

Example Data Center

Figure 15:
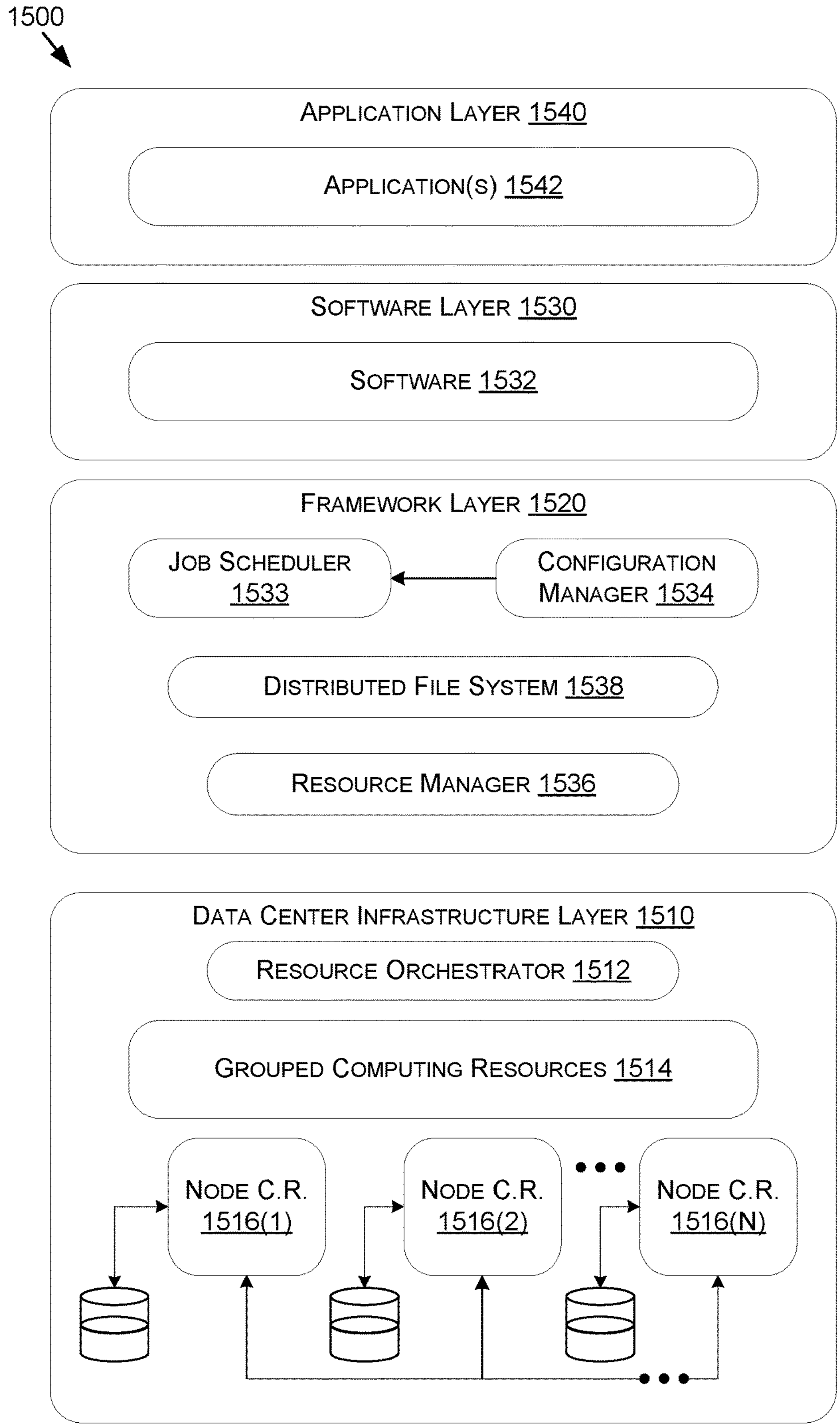
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s

1516(1)-1516(N) may correspond to a server having one or more of the above-mentioned computing resources. In addition, in some embodiments, the node C.R.s 1516(1)-15161 (N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1512 may configure or otherwise control one or more node C.R.s 1516(1)-1516(N) and/or grouped computing resources 1514. In at least one embodiment, resource orchestrator 1512 may include a software design infrastructure (SDI) management entity for the data center 1500. The resource orchestrator 1512 may include hardware, software, or some combination thereof.

In at least one embodiment, as shown in FIG. 15, framework layer 1520 may include a job scheduler 1533, a configuration manager 1534, a resource manager 1536, and/or a distributed file system 1538. The framework layer 1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1533 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1533. In at least one embodiment, clustered or grouped computing resources may include grouped computing resource 1514 at data center infrastructure layer 1510. The resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, using one or more first machine learning models and based at least on image data representative of at least a first image associated with a first time and a second image associated with a second time that is after the first time, at least a tracked feature that is depicted by and tracked between the first image and the second image;

determining, using one or more second machine learning models and based at least on at least a portion of the image data representative of the second image, at least a detected feature that is depicted by the second image, the one or more second machine learning models being different from the one or more first machine learning models;

determining, based at least on a distance between the tracked feature and the detected feature within the second image, an association between the tracked feature depicted in the second image and the detected feature depicted in the second image;

determining, based at least on the association and by at least merging the tracked feature depicted by the second image with the detected feature depicted by the second image, a merged feature that represents both the tracked feature and the detected feature;

outputting data representative of at least a portion of merged features that includes at least the merged feature; and causing, based at least on the data representative of the at least the portion of the merged features, a machine to navigate within an environment.

2. The method of claim 1, further comprising:

determining that one or more portions of the second image are associated with one or more threshold numbers of features; and determining the at least the portion of the merged features based at least on the one or more threshold numbers of features.

3. The method of claim 2, wherein the determining the at least the portion of the merged features comprises:

determining that a portion of the one or more portions of the second image is associated with one or more merged features of the merged features, a number of the one or more merged features being less than or equal to a threshold number of features of the one or more threshold numbers of features; and determining, based at least on the number being less than or equal to the threshold number of features, that the at least the portion of the merged features includes at least the one or more merged features.

4. The method of claim 2, wherein the determining the at least the portion of the merged features comprises:

determining that a portion of the one or more portions of the second image is associated with first merged features of the merged features, a number of the first merged features being greater than a threshold number of features of the one or more threshold numbers of features; and determining, based at least on the number being greater than the threshold number of features, that the at least the portion of the merged features includes a portion of the first merged features.

5. The method of claim 1, further comprising:

determining, using the one or more first machine learning models and based at least on the at least the portion of the image data representative of the second image, first confidence scores associated with tracked features that include at least the tracked feature;

determining, using the one or more second machine learning models and based at least on the at least the portion of the image data representative of the second image, second confidence scores associated with detected features that include at least the detected feature; and determining, based on at least a portion of the first confidence scores and at least a portion of the second confidence scores, the at least the portion of the merged features.

6. The method of claim 1, wherein the merging the tracked feature depicted by the second image with the detected feature depicted by the second image comprises:

determining that the distance is within a threshold distance; and selecting, based at least on the distance being within the threshold distance, one of the tracked feature or the detected feature to include as the merged feature.

7. The method of claim 1, further comprising:

determining that a number of the merged features is greater than a threshold number of features; and determining, based at least on the number of the merged features being greater than the threshold number of features, the at least the portion of the merged features by removing one or more merged features from the merged features.

8. The method of claim 1, further comprising:

determining, using the one or more first machine learning models and based at least on second image data representative of a third image and the data representative of the at least the portion of the merged features, one or more second tracked features associated with the third image;

determining, using the one or more second machine learning models and based at least on the second image data representative of the third image, one or more second detected features associated with the third image;

determining, based at least on the one or more second tracked features and the one or more second detected features, one or more second merged features associated with the third image; and outputting second data representative of at least a portion of the one or more second merged features.

9. The method of claim 1, further comprising:

processing the at least the portion of the image data to generate second image data representative of a third image, the second image including a first resolution that is different than a second resolution of the third image, wherein at least one of:

the determining the tracked feature is further based at least on the second image data; or the determining the detected feature is further based at least on the second image data.

10. The method of claim 1, further comprising:

processing tracked features that include at least the tracked feature to determine a portion of the tracked features, wherein the processing comprises one or more of:

removing one or more first tracked features of the tracked features that are located within a threshold distance to one or more second tracked features of the tracked features; or removing one or more third tracked features of the tracked features that are associated with one or more confidence scores that are less than a threshold confidence score, wherein the tracked feature is included in the portion of the tracked features.

11. One or more processors comprising processing circuitry to:

determine, using one or more first machine learning models and based at least on image data representative of at least a first image associated with a first time and a second image associated with a second time that is after the first time, at least a tracked feature point that is depicted by the first image and the second image;

determine, using one or more second machine learning models and based on at least a portion of the image data representative of the second image, at least a detected feature point that is depicted by the second image;

determine that a distance between the tracked feature point and the detected feature point within the second image is within a threshold distance;

determine, based at least on the distance being within the threshold distance, a merged feature point that represents both the tracked feature point and the detected feature point; and cause, based at least on the merged feature point, a machine to navigate within an environment.

12. The one or more processors of claim 11, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

13. A system comprising:

one or more processors to:

determine, using one or more first machine learning models and based at least on image data representative of at least a first image associated with a first time and a second image associated with a second time that is after the first time, at least a tracked feature point that is depicted by the first image and the second image;

determine, using one or more second machine learning models and based on at least a portion of the image data representative of the second image, at least a detected feature point that is depicted by the second image;

determine that a distance between the tracked feature point and the detected feature point within the second image is within a threshold distance;

determine, based at least on the distance being within the threshold distance, a merged feature point that represents both the tracked feature point and the detected feature point; and cause, based at least on the merged feature point, a machine to navigate within an environment.

14. The system of claim 13, wherein the one or more processors are further to:

determine, based at least on the distance being within the threshold distance, an association between the tracked feature point and the detected feature point, wherein the merged feature point is determined based at least on the association.

15. The system of claim 13, wherein the one or more processors are further to output data representative of at least a portion of merged feature points that includes at least the merged feature point.

16. The system of claim 15, wherein the one or more processors are further to:

determine that one or more portions of the second image are associated with one or more threshold numbers of feature points; and determine the at least the portion of the merged feature points based at least on the one or more threshold numbers of feature points.

17. The system of claim 13, wherein the one or more processors are further to:

determine, using the one or more first machine learning models and based on the at least the portion of the image data representative of the second image, a first confidence score associated with the tracked feature point; and determine, using the one or more second machine learning models and based on the at least the portion of the image data representative of the second image, a second confidence score associated with the detected feature point, wherein the merged feature point is further determined based at least on the first confidence score and the second confidence score.

18. The system of claim 13, wherein one of:

the merged feature point includes one of the tracked feature point or the detected feature point; or the merged feature point includes a new feature point generated using the tracked feature point and the detected feature point.

19. The system of claim 13, wherein the one or more second machine learning models are different from the one or more first machine learning models.

20. The system of claim 13, wherein system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *